(12) United States Patent
Imai

(10) Patent No.: US 10,870,409 B2
(45) Date of Patent: Dec. 22, 2020

(54) GAS GENERATOR

(71) Applicant: NIPPON KAYAKU KABUSHIKI KAISHA, Chiyoda-ku (JP)

(72) Inventor: Takahiro Imai, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 23 days.

(21) Appl. No.: 15/770,337

(22) PCT Filed: Oct. 21, 2016

(86) PCT No.: PCT/JP2016/081246
§ 371 (c)(1),
(2) Date: Apr. 23, 2018

(87) PCT Pub. No.: WO2017/073475
PCT Pub. Date: May 4, 2017

(65) Prior Publication Data
US 2018/0304848 A1 Oct. 25, 2018

(30) Foreign Application Priority Data

Oct. 27, 2015 (JP) .................. 2015-210510

(51) Int. Cl.
*B60R 21/264* (2006.01)
*B60R 21/26* (2011.01)
(52) U.S. Cl.
CPC ........ *B60R 21/2644* (2013.01); *B60R 21/264* (2013.01); *B60R 2021/26011* (2013.01)
(58) Field of Classification Search
CPC .............. B60R 21/264; B60R 21/2644; B60R 21/2646
See application file for complete search history.

(56) References Cited

U.S. PATENT DOCUMENTS 6,332,404 B1 * 12/2001 Rink .................. B60R 21/264
102/530
6,779,812 B2 * 8/2004 Ishida ................ B60R 21/2644
280/728.1

(Continued)

FOREIGN PATENT DOCUMENTS

CN 204586768 U 8/2015
JP 11-78766 A 3/1999

(Continued)

OTHER PUBLICATIONS

Extended European Search Report dated Feb. 22, 2019 in the corresponding European Application No. 16859705.2 citing document AO therein 6 pages.

(Continued)

*Primary Examiner* — Barry Gooden, Jr.
(74) *Attorney, Agent, or Firm* — Oblon, McClelland, Maier & Neustadt, L.L.P.

(57) ABSTRACT

A gas generator includes a housing, a partition member which divides a space in the housing into a combustion chamber where a gas generating agent is accommodated and a filter chamber where a filter is accommodated, and a sealed container which externally seals the gas generating agent. The filter has a hollow portion which reaches an axial end surface located on a side of the combustion chamber. The sealed container is made of a member relatively low in mechanical strength so as to burst or melt as a result of burning of the gas generating agent. The partition member is made of a member relatively high in mechanical strength such that only a portion opposed to the hollow portion bursts as a result of burning of the gas generating agent to provide a communication hole which allows communication between the combustion chamber and the filter chamber with each other.

13 Claims, 13 Drawing Sheets

(56) References Cited

U.S. PATENT DOCUMENTS

| | | | |
|---|---|---|---|
| 8,794,665 B2* | 8/2014 | Biebl | B60R 21/2644 |
| | | | 102/704 |
| 2011/0265678 A1 | 11/2011 | Sasamoto et al. | |
| 2012/0048137 A1* | 3/2012 | Hagihara | B60R 21/2644 |
| | | | 102/530 |
| 2016/0016531 A1* | 1/2016 | Seidl | B60R 21/264 |
| | | | 102/202.5 |
| 2017/0028964 A1* | 2/2017 | Bierwirth | B60R 21/26 |
| 2017/0210333 A1* | 7/2017 | Imai | B60R 21/264 |
| 2019/0077360 A1* | 3/2019 | Imai | B01J 7/00 |

FOREIGN PATENT DOCUMENTS

| | | |
|---|---|---|
| JP | 2005-313812 A | 11/2005 |
| JP | 2009-286218 A | 12/2009 |
| JP | 2010-159051 A | 7/2010 |
| JP | 2013-63780 A | 4/2013 |
| WO | WO 2010/079710 A1 | 7/2010 |

OTHER PUBLICATIONS

International Search Report dated Dec. 20, 2016 in PCT/JP2016/081246 filed Oct. 21, 2016.
Combined Chinese Office Action and Search Report dated Dec. 19, 2019, in Patent Application No. 201680063422.0, citing document AO therein, 11 pages (with English translation and English Translation of Category of Cited Documents).

* cited by examiner

GAS GENERATOR

TECHNICAL FIELD

The present invention relates to a gas generator incorporated in an air bag apparatus as a passenger protection apparatus equipped in a car and the like, and particularly to a gas generator having an elongated columnar outer geometry.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with a developed air bag by instantaneously expanding and developing the air bag at the time of collision of a vehicle. A gas generator is equipment which is incorporated in an air bag apparatus and expands and develops an air bag by instantaneously generating a gas at the time of collision of a vehicle.

Based on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, an air bag apparatus on a passenger's seat side, a curtain air bag apparatus, a knee air bag apparatus, or a seat cushion air bag apparatus.

Normally, in a cylinder type gas generator, an igniter is installed at one end portion in an axial direction of a housing, a combustion chamber accommodating a gas generating agent is provided on a side of one end portion in the axial direction of the housing, a filter chamber accommodating a filter is provided on a side of the other end portion in the axial direction of the housing, and a gas discharge opening is provided in a circumferential wall portion of the housing in a portion defining the filter chamber. In the cylinder type gas generator thus constructed, in general, a gas generated in the combustion chamber flows into the filter chamber and passes through the filter, and the gas which has passed through the filter is discharged to the outside through the gas discharge opening. In addition to the cylinder type gas generator, what is called a T-shaped gas generator is available as a gas generator having an elongated columnar outer geometry.

For example, Japanese Patent Laying-Open No. 2005-313812 (PTD 1), Japanese Patent Laying-Open No. 11-78766 (PTD 2), and WO2010/079710 (PTD 3) disclose specific structures of the cylinder type gas generator constructed as above. These publications each disclose a cylinder type gas generator in which a space in a housing is divided into a combustion chamber accommodating a gas generating agent and a filter chamber accommodating a filter by arranging a partition member in an elongated cylindrical housing having opposing ends closed.

CITATION LIST

Patent Document

PTD 1: Japanese Patent Laying-Open No. 2005-313812
PTD 2: Japanese Patent Laying-Open No. 11-78766
PTD 3: WO2010/079710

SUMMARY OF INVENTION

Technical Problem

In general, it is important for the gas generator to reliably seal a space where the gas generating agent is accommodated from an external space in order to prevent the gas generating agent from absorbing moisture. If the gas generating agent is not properly sealed, outside air enters and the gas generating agent absorbs moisture. Then, disadvantageously, desired output characteristics are not obtained at the time of activation of the gas generator.

Various methods for preventing absorption of moisture by the gas generating agent are available. As disclosed in WO2010/079710, a method of accommodating and hermetically sealing a gas generating agent in a sealed container relatively low in mechanical strength and arranging the sealed container in a housing is suitably employed. By adopting this method, the gas generating agent can readily be sealed without adopting a complicated sealing structure including an O ring as disclosed in Japanese Patent Laying-Open No. 2005-313812 and Japanese Patent Laying-Open No. 11-78766, an assembly operation is facilitated, and manufacturing cost can be suppressed.

A partition member serving as a partition between a combustion chamber and a filter chamber is required to function as a pressure bulkhead which can withstand thrust of a gas at a high temperature and a high pressure generated in the combustion chamber when a gas generator is activated, can maintain a high internal pressure in the combustion chamber, and thereafter can open the combustion chamber at the time point when the internal pressure in the combustion chamber is sufficiently raised.

From a point of view of decrease in number of components, a thickness of a part of the sealed container described above may be increased to implement the partition member with its portion having such an increased thickness. The sealed container, however, is basically made of a member relatively low in mechanical strength as described above. Therefore, even though the sealed container is constructed to be thick to a considerable extent, the sealed container will burst or melt before an internal pressure in the combustion chamber sufficiently increases. Then, burning of the gas generating agent is not sustained or a large amount of harmful component such as carbon monoxide is contained in emitted gas. Consequently, sufficient or satisfactory gas output is not obtained.

In the gas generator disclosed in each of Japanese Patent Laying-Open No. 2005-313812 and Japanese Patent Laying-Open No. 11-78766, a prescribed position in a circumferential wall portion of the housing is caulked inward to axially fix the partition member inserted in the housing so that the above-described function as the pressure bulkhead is exhibited by the partition member.

When such a construction is adopted, however, it is necessary to separately subject the housing to caulking for attachment of the partition member or to form a partition member to a large thickness in order to prevent unintended deformation of the partition member supported only by the housing, which has posed difficulties in reduction in length, diameter, or weight of the gas generator. An operation for caulking is also relatively complicated, which also has been a factor for increase in manufacturing cost.

The gas generator disclosed in WO2010/079710 includes a partition member constituted of an annular plate portion and a cylindrical portion, the annular plate portion of the partition member covering an axial end surface of a filter. The cylindrical portion of the partition member is inserted in a hollow portion of the filter and the cylindrical portion is decreased or increased in diameter such that an area of opening is varied as a distance from the annular plate portion is greater. Thus, intended deformation in the partition member and the filter in a portion adjacent thereto is achieved at the time of activation of the gas generator and the above-described function as the pressure bulkhead is thus exhibited.

Such a construction is more advantageous in reduction in length, diameter, or weight of the gas generator and in facilitation of manufacturing than the constructions disclosed in Japanese Patent Laying-Open No. 2005-313812 and Japanese Patent Laying-Open No. 11-78766 described above. Special working also of the filter in conformity with a shape of the cylindrical portion of the partition member, however, is required, and manufacturing cost disadvantageously increases in this aspect.

Therefore, the present invention was made to solve the above-described problems, and an object thereof is to provide a gas generator which can be reduced in size and weight and can allow significant suppression in manufacturing cost without lowering in performance and for which a sealing process for preventing absorption of moisture by a gas generating agent is easily performed.

Solution to Problem

A gas generator based on the present invention includes a housing, an igniter, a partition member, and a sealed container. The housing contains a combustion chamber in which a gas generating agent is arranged and a filter chamber in which a filter is arranged, and is in an elongated cylindrical shape having one end portion and the other end portion in an axial direction closed. The igniter serves to burn the gas generating agent and is assembled to the one end portion of the housing. The partition member axially divides a space in the housing so as to form the combustion chamber at a position on a side of the one end portion of the housing and to form the filter chamber at a position on a side of the other end portion of the housing. The sealed container accommodates the gas generating agent in a hermetically sealed state. The housing has, in a portion defining the filter chamber, a gas discharge opening for discharging a gas to outside. The filter has a hollow portion extending along an axial direction of the housing and reaching an axial end surface located on a side of the combustion chamber. The sealed container is made of a member composed of a material lower in mechanical strength than the partition member such that at least a part of a portion opposed to the hollow portion of the filter bursts or melts with increase in pressure or temperature of the combustion chamber as a result of burning of the gas generating agent. The partition member is made of a member composed of a material higher in mechanical strength than the sealed container such that at least a part of a portion opposed to the hollow portion of the filter bursts with increase in pressure in the combustion chamber as a result of burning of the gas generating agent to provide a communication hole which allows communication between the combustion chamber and the filter chamber.

In the gas generator based on the present invention, the sealed container may be arranged such that an axial end portion located on a side of the filter chamber abuts on the axial end surface of the filter located on a side of the combustion chamber, and in that case, preferably, the partition member is arranged in the sealed container to abut on the axial end portion of the sealed container located on the side of the filter chamber. This manner will be referred to as a first manner below.

In the first manner of the gas generator based on the present invention, the partition member may be in a shape of a flat plate.

In the first manner of the gas generator based on the present invention, when the partition member is in a shape of a flat plate, the axial end portion of the sealed container located on the side of the filter chamber preferably includes a small-thickness portion relatively smaller in thickness and a large-thickness portion relatively greater in thickness. In that case, the small-thickness portion is preferably located at least in a portion opposed to the hollow portion of the filter and the large-thickness portion is preferably located at least in a portion opposed to an outer edge portion of the axial end surface of the filter located on the side of the combustion chamber.

In the first manner of the gas generator based on the present invention, the partition member may be in a shape of a cup including a top plate portion in a form of a flat plate and a side plate portion in a form of a cylindrical wall. In that case, preferably, the top plate portion abuts on the axial end surface of the filter located on the side of the combustion chamber and the side plate portion abuts on a sidewall portion of the sealed container.

In the gas generator based on the present invention, the partition member may be arranged outside the sealed container so as to abut on the axial end surface of the filter located on the side of the combustion chamber, and in that case, the sealed container is preferably arranged such that the axial end portion located on the side of the filter chamber abuts on the partition member. This manner will be referred to as a second manner below.

In the second manner of the gas generator based on the present invention, the partition member may be in a shape of a flat plate.

In the second manner of the gas generator based on the present invention, when the partition member is in a shape of a flat plate, the axial end portion of the sealed container located on the side of the filter chamber preferably includes a small-thickness portion relatively smaller in thickness and a large-thickness portion relatively greater in thickness. In that case, the small-thickness portion is preferably located at least in a portion opposed to the hollow portion of the filter and the large-thickness portion is preferably located at least in a portion opposed to an outer edge portion of the axial end surface of the filter located on the side of the combustion chamber.

In the second manner of the gas generator based on the present invention, the partition member may be in a shape of a cup including a top plate portion in a form of a flat plate and a side plate portion in a form of a cylindrical wall. In that case, preferably, the top plate portion abuts on the axial end surface of the filter located on the side of the combustion chamber and the side plate portion abuts on a circumferential wall portion of the housing.

In the gas generator based on the present invention, the partition member preferably has a score in a portion opposed to the hollow portion of the filter.

In the gas generator based on the present invention, the partition member may be provided with a through hole in a portion opposed to the hollow portion of the filter.

In the gas generator based on the present invention, preferably, the sealed container is made of aluminum or an aluminum alloy and the partition member is made of iron or an iron alloy.

Advantageous Effects of Invention

According to the present invention, a gas generator which can be reduced in size and weight and can allow significant suppression in manufacturing cost without lowering in performance and for which a sealing process for preventing absorption of moisture by a gas generating agent is easily performed can be obtained.

DESCRIPTION OF EMBODIMENTS

Figure 1:
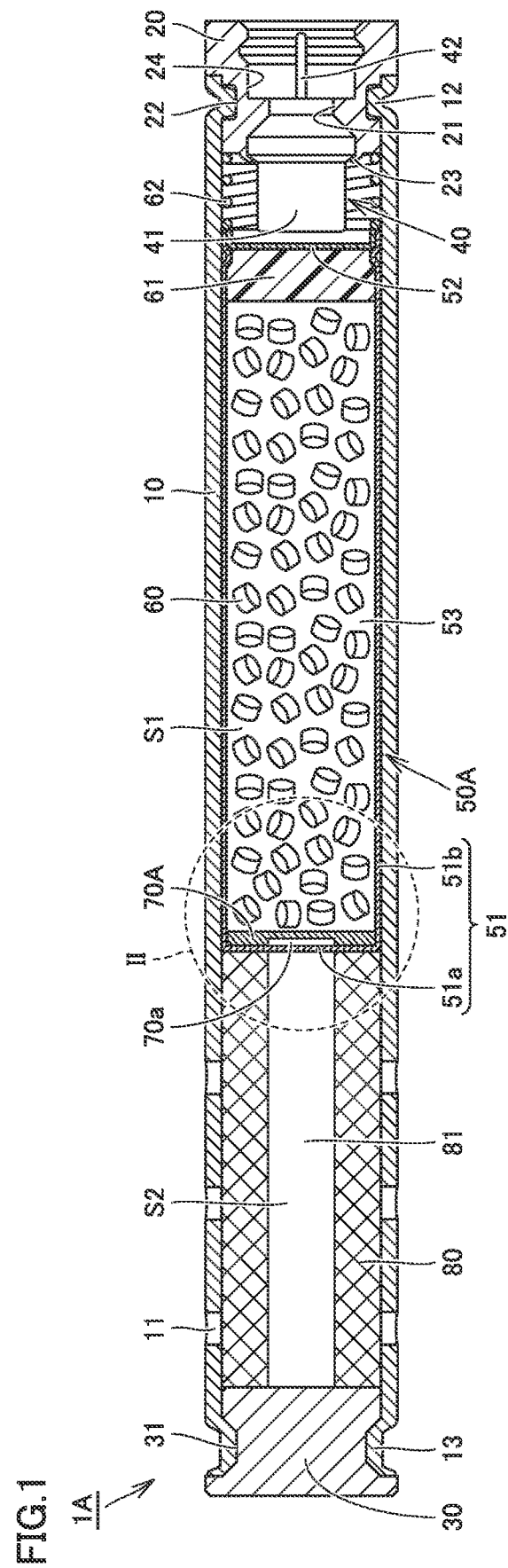
FIG. 1 is a schematic diagram of a cylinder type gas generator in a first embodiment of the present invention.

An embodiment of the present invention will be described hereinafter in detail with reference to the drawings. An embodiment shown below represents application of the present invention to a cylinder type gas generator incorporated in a side air bag apparatus. The same or common elements in embodiments shown below have the same reference characters allotted in the drawings and description thereof will not be repeated.

First Embodiment

FIG. 1 is a schematic diagram of a cylinder type gas generator in a first embodiment of the present invention. A construction of a cylinder type gas generator 1A in the present embodiment will initially be described with reference to FIG. 1.

As shown in FIG. 1, cylinder type gas generator 1A in the present embodiment has an elongated columnar outer geometry and has an elongated cylindrical housing having closed one and the other end portions located in an axial direction. The housing includes a housing main body 10, a holder 20, and a closing member 30. The housing constituted of housing main body 10, holder 20, and closing member 30 accommodates an igniter 40, a sealed container 50A, a gas generating agent 60, a cushion material 61, a coil spring 62, a partition member 70A, and a filter 80 which are internal constituent elements. In the housing, a combustion chamber S1 in which gas generating agent 60 of the internal constituent elements described above is mainly arranged and a filter chamber S2 in which filter 80 is arranged are located.

Housing main body 10 is formed from a member having an elongated cylindrical circumferential wall portion having openings provided at opposing ends in the axial direction. Holder 20 is made of a cylindrical member having a through portion 21 extending along a direction the same as the axial direction of housing main body 10 and holder 20 has an annular groove portion 22 for fixing by caulking which will be described later around its outer circumferential surface. Closing member 30 is formed from a disc-shaped member having a prescribed thickness and has an annular groove portion 31 for fixing by caulking which will be described later around its circumferential surface. Annular groove portions 22 and 31 for fixing by caulking are provided to extend along a circumferential direction in the outer circumferential surface of holder 20 and the circumferential surface of closing member 30, respectively.

Holder 20 is fixed to housing main body 10 so as to close one opening end in the axial direction of housing main body 10. Specifically, with holder 20 being inserted in one opening end of housing main body 10, the circumferential wall portion of housing main body 10 in a portion corresponding to annular groove portion 22 provided in the outer circumferential surface of holder 20 is decreased in diameter radially inward and engaged with annular groove portion 22 so that holder 20 is fixed by caulking to housing main body 10. One end portion in the axial direction of the housing is thus formed by holder 20.

Closing member 30 is fixed to housing main body 10 so as to close the other opening end in the axial direction of housing main body 10. Specifically, with closing member 30 being inserted in the other opening end of housing main body 10, the circumferential wall portion of housing main body 10 in a portion corresponding to annular groove portion 31 provided in the circumferential surface of closing member 30 is decreased in diameter radially inward and engaged with annular groove portion 31 so that closing member 30 is fixed by caulking to housing main body 10. The other end portion in the axial direction of the housing is thus formed by closing member 30.

Such fixing by caulking is called omnidirectional caulking in which the circumferential wall portion of housing main body 10 is substantially uniformly decreased in diameter radially inward. With such omnidirectional caulking, caulking portions 12 and 13 are provided in the circumferential wall portion of housing main body 10 and caulking portions 12 and 13 are in intimate contact with respective annular groove portions 22 and 31. Thus, a gap is prevented from being provided between housing main body 10 and holder 20 and between housing main body 10 and closing member 30.

Housing main body 10 may be formed from a member made of a metal such as stainless steel, iron steel, an aluminum alloy, or a stainless alloy, from a press-formed product resulting from forming in a cylindrical shape by press-working of a rolled steel plate represented by SPCE, or from an electric resistance welded tube represented by STKM. In particular, when housing main body 10 is formed from a press-formed product of a rolled steel plate or an electric resistance welded tube, housing main body 10 can be formed more inexpensively and readily and with much lighter weight than when the housing main body is formed from a member made of a metal such as stainless steel or iron steel. Holder 20 and closing member 30 are formed from a member made of a metal such as stainless steel, iron steel, an aluminum alloy, or a stainless alloy.

Igniter 40 is assembled to one end portion described above in the axial direction of the housing as being supported by holder 20. Igniter 40 serves to burn gas generating agent 60 and is set to face a space inside the housing. More specifically, holder 20 has a caulking portion 23 for fixing by caulking of igniter 40 at an axial end portion which faces the space inside the housing, and igniter 40 is fixed as being held in holder 20 by caulking of caulking portion 23 described above while igniter 40 is inserted in through portion 21 to abut on a wall portion of a portion which defines through portion 21 in holder 20.

Igniter 40 includes an ignition portion 41 and a pair of terminal pins 42. In ignition portion 41, a resistor (bridge wire) is attached to be connected to the pair of terminal pins 42, and an ignition agent is loaded in ignition portion 41 so as to surround the resistor or to be in contact with the resistor. An enhancer agent may also be loaded as necessary in ignition portion 41.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent. A squib cup surrounding ignition portion 41 is generally made of a metal or a plastic.

Upon sensing collision, a prescribed amount of current flows in a resistor through terminal pin 42. As the prescribed amount of current flows in the resistor, Joule heat is generated in the resistor and the ignition agent starts burning. Flame at a high temperature caused by burning bursts the squib cup accommodating the ignition agent. A time period from flow of a current in the resistor until activation of igniter 40 is generally not longer than 2 milliseconds in a case that the Nichrome wire is employed as the resistor.

A recess portion 24 is provided as being continuous to through portion 21 described above at an axial end portion of holder 20 exposed to the outside. Recess portion 24 provides a female connector portion which receives a male connector (not shown) of a harness for connecting igniter 40 and a control unit (not shown) to each other, and a portion close to a tip end of terminal pin 42 of igniter 40 is located as being exposed in recess portion 24. A male connector is inserted in recess portion 24 serving as the female connector portion so that electrical conduction between a core of the harness and terminal pin 42 is achieved.

In the space in the housing, sealed container 50A is arranged in a space adjacent to the space where holder 20 and igniter 40 assembled thereto are arranged. Sealed container 50A includes a cup body 51 and a cap body 52 closing an opening of cup body 51, and is inserted in the circumferential wall portion of housing main body 10. In sealed container 50A, cup body 51 and cap body 52 are combined and joined to each other so that an accommodation space 53 provided in sealed container 50A is hermetically sealed from the outside of sealed container 50A.

Sealed container 50A is made of a member composed of a material low in mechanical strength such that at least a part thereof bursts or melts as a result of burning of gas generating agent 60. More specifically, cup body 51 and cap body 52 are formed from a press-formed product made of a metal such as copper, aluminum, a copper alloy, or an aluminum alloy or from a resin molded product formed by injection molding or sheet forming. Brazing, bonding, welding, or tightening by winding (caulking) is suitably employed for joint between cup body 51 and cap body 52. Hermeticity can also further be enhanced by separately using a sealant in joint.

Cup body 51 of sealed container 50A includes a top wall portion 51a and a sidewall portion 51b. Top wall portion 51a defines an axial end portion of sealed container 50A located on a side of filter chamber S2 by being positioned to axially divide a space in the housing, and sidewall portion 51b extends from an end portion on an outer circumferential side of top wall portion 51a along an inner circumferential surface of housing main body 10 toward holder 20.

Sealed container 50A is fitted or loosely fitted to the circumferential wall portion of housing main body 10, and the circumferential wall portion of housing main body 10 has not been subjected to caulking for fixing of sealed container 50A. Fitting includes what is called press-fitting and refers to such a state that the outer circumferential surface of sealed container 50A is attached to the inner circumferential surface of housing main body 10 as being in contact therewith. Loose fitting refers to a state that the outer circumferential surface of sealed container 50A and the inner circumferential surface of housing main body 10 are not necessarily in contact with each other around the entire circumference but the sealed container is inserted with a slight gap (play) being interposed. From a point of view of facilitation in assembly, sealed container 50A is preferably loosely fitted to the circumferential wall portion of housing main body 10.

Gas generating agent 60, cushion material 61, and partition member 70A are accommodated in accommodation space 53 in sealed container 50A. More specifically, cushion material 61 is arranged at an end portion of sealed container 50A on a side where igniter 40 is located, partition member 70A is arranged at the end portion of sealed container 50A on the side where filter 80 is located, and gas generating agent 60 is arranged in a portion except for portions where cushion material 61 and partition member 70A are arranged (that is, a portion therebetween).

Gas generating agent 60 is an agent which is ignited by thermal particles generated as a result of activation of igniter 40 and produces a gas as it burns. A non-azide-based gas generating agent is preferably employed as gas generating agent 60, and gas generating agent 60 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 60 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1A is incorporated, and for example, a shape optimal for the specifications is preferably selected by selecting a shape allowing change over time of a rate of generation of a gas during burning of gas generating agent 60. Furthermore, in addition to a shape of gas generating agent 60, a size of a molding or an amount thereof for filling is preferably selected as appropriate, in consideration of a linear burning velocity, a pressure exponent, or the like of gas generating agent 60.

Cushion material 61 is provided for the purpose of preventing gas generating agent 60 made of a molding from being crushed by vibration or the like, and suitably made of a molding of ceramic fibers, rock wool, a foamed resin (such as foamed silicone, foamed polypropylene, or foamed polyethylene), or rubber represented by chloroprene and EPDM. Cushion material 61 opens or splits due to thermal particles produced as a result of activation of igniter 40 and is burnt down in some cases. Instead of cushion material 61, for example, a coil spring can also be made use of.

Partition member 70A is in a shape of a circular flat plate in a plan view and made of a member composed of a material higher in mechanical strength than sealed container 50A described above. More specifically, partition member 70A is preferably made of iron or an iron alloy and made, for example, of stainless steel or iron steel.

Partition member 70A is arranged such that a main surface thereof is orthogonal to the axial direction of housing main body 10. The space in the housing is thus axially divided by partition member 70A into combustion chamber S1 located on the side of holder 20 and filter chamber S2 located on the side of closing member 30.

Partition member 70A exhibits a function as a pressure bulkhead which can withstand thrust of a gas at a high temperature and a high pressure generated in combustion chamber S1 when cylinder type gas generator 1A is activated, can maintain a high internal pressure in combustion chamber S1, and thereafter can open combustion chamber S1 at the time point when the internal pressure in combustion chamber S1 is sufficiently raised. A detailed construction or a function of the partition member will be described later.

A coil spring 62 is arranged between holder 20 and sealed container 50A so as to surround ignition portion 41 of igniter 40. Coil spring 62 is a member for fixing sealed container 50A and filter 80 in the axial direction in the housing, and at the same time, it is a member for absorbing variation in axial length of these constituent elements. Therefore, coil spring 62 is fixed as lying between sealed container 50A and holder 20 in the axial direction of housing main body 10. Instead of coil spring 62, for example, a member similar to cushion material 61 may form such member for fixing such a member.

In the space in the housing, filter 80 is arranged in a space adjacent to the space where sealed container 50A is arranged, which is located between sealed container 50A and closing member 30. Filter 80 is formed from a cylindrical member having a hollow portion 81 extending in a direction the same as the axial direction of housing main body 10, has axial one end surface abutting on top wall portion 51a of sealed container 50A, and has axial the other end surface abutting on closing member 30.

Filter 80 functions as cooling means for cooling a gas by depriving the gas of heat at a high temperature of the gas when the gas produced as a result of burning of gas generating agent 60 passes through this filter 80 and also functions as removal means for removing slag (residues) or the like contained in the gas. As described above, by making use of filter 80 formed from a cylindrical member, a flow resistance against a gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 80. Specifically, a wire gauze of stocking stitch, a plain-woven wire gauze, an aggregate of crimped metal wire rods, or a material obtained by compressing the former with the use of a press is made use of. Alternatively, a material obtained by winding a perforated metal plate can also be made use of. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

In the circumferential wall portion of housing main body 10 in a portion defining filter chamber S2, a plurality of gas discharge openings 11 are provided along the circumferential direction and the axial direction of the circumferential wall portion. The plurality of gas discharge openings 11 serve to guide a gas which has passed through filter 80 to the outside of the housing.

Figure 2:
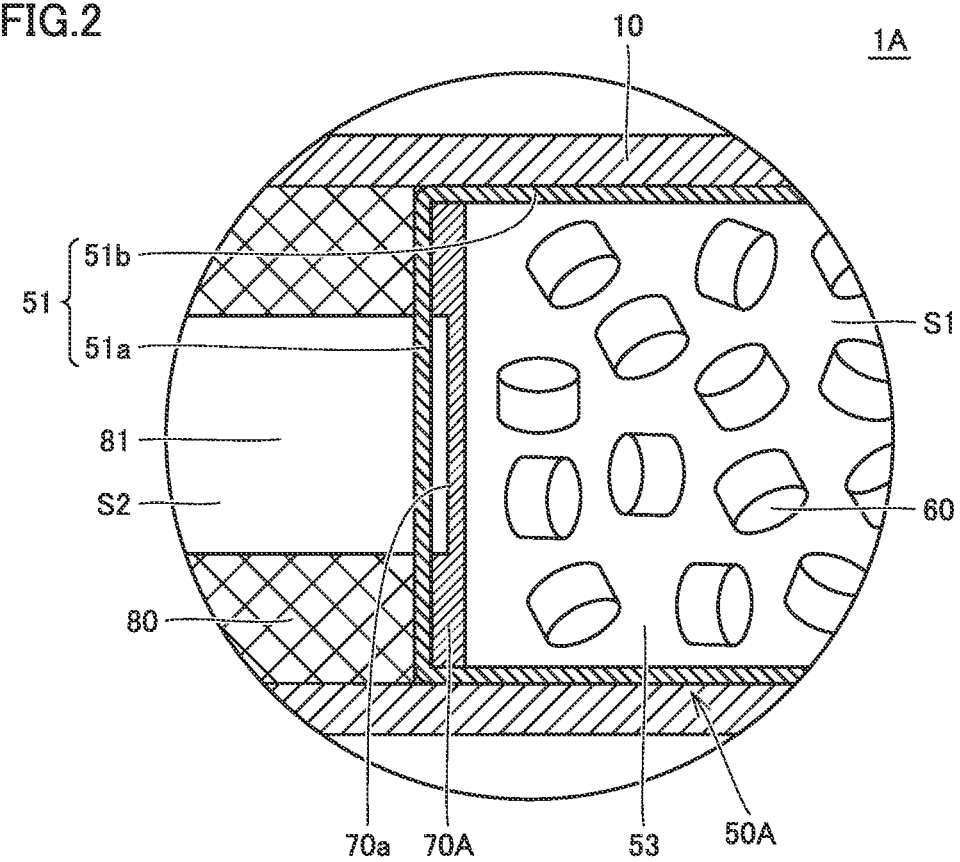
FIG. 2 is an enlarged cross-sectional view of a main portion of the cylinder type gas generator shown in FIG. 1.
Figure 3:
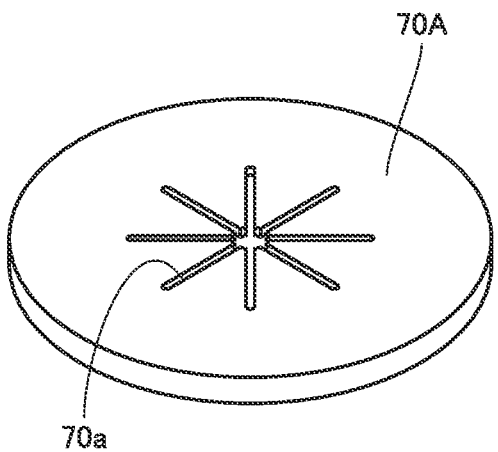
FIG. 3 is a perspective view of a partition member shown in FIG. 1.

FIG. 2 is an enlarged cross-sectional view of a region II shown in FIG. 1 of the cylinder type gas generator shown in FIG. 1 and FIG. 3 is a perspective view of the partition member shown in FIG. 1. A detailed construction of partition member 70A of cylinder type gas generator 1A in the present embodiment will now be described with reference to FIGS. 2 and 3.

Referring to FIGS. 2 and 3, as described above, partition member 70A is in a shape of a circular flat plate in a plan view and arranged in the end portion on the side of filter chamber S2 in accommodation space 53 in sealed container 50A. More specifically, partition member 70A is arranged such that the main surface thereof abuts on top wall portion 51a of sealed container 50A and the circumferential surface thereof abuts on sidewall portion 51b of sealed container 50A.

A score 70a is provided in the main surface of partition member 70A which abuts on top wall portion 51a. Score 70a is provided for causing desired change in shape of partition member 70A with increase in internal pressure in combustion chamber S1 as a result of burning of gas generating agent 60 (that is, such change in form that a communication hole 73 (see FIG. 4) which will be described later is provided as a result of burst of a part of partition member 70A), and it is provided, for example, as a plurality of grooves provided to radially intersect with one another. Score 70a is provided in a portion of partition member 70A opposed to hollow portion 81 of filter 80. In the present embodiment, score 70a is constructed such that a diameter thereof matches with a diameter of hollow portion 81 of filter 80.

Figure 4:
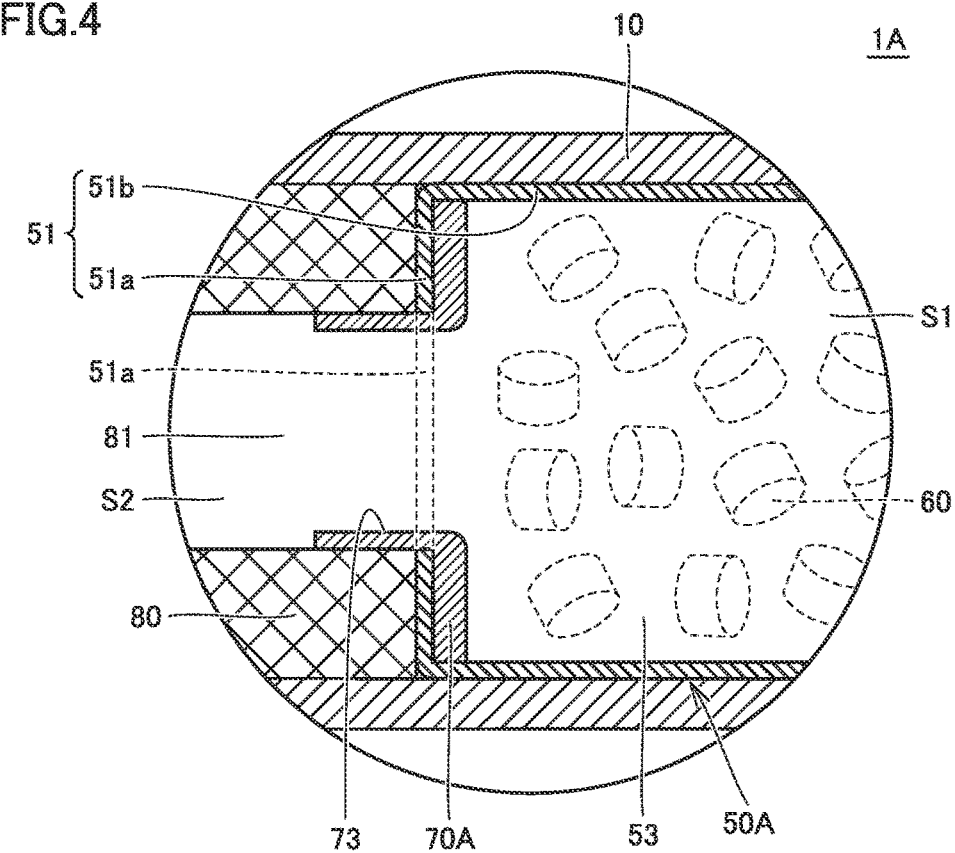
FIG. 4 is an enlarged cross-sectional view of a main portion showing a state at the time of activation of the cylinder type gas generator shown in FIG. 1.

FIG. 4 is an enlarged cross-sectional view of a main portion showing a state at the time of activation of the cylinder type gas generator shown in FIG. 1. An operation of cylinder type gas generator 1A in the present embodiment when it is activated will now be described with reference to FIG. 4 and FIG. 1 described previously.

Referring to FIG. 1, when a vehicle on which cylinder type gas generator 1A in the present embodiment is mounted collides, collision is sensed by collision sensing means separately provided in the vehicle and igniter 40 is activated based thereon by current feed caused by a control unit separately provided in the vehicle.

When igniter 40 is activated, an ignition agent or an enhancer agent in addition thereto burns, so that a pressure in ignition portion 41 increases, ignition portion 41 thus bursts, and thermal particles flow out of ignition portion 41. The thermal particles which have flowed out burst or melt cap body 52 of sealed container 50A and reach cushion material 61. The thermal particles which have reached cushion material 61 burn cushion material 61 and open or split the cushion material, and thus the thermal particles reach gas generating agent 60.

The thermal particles which have reached gas generating agent 60 burn gas generating agent 60 and thus a large amount of gas is generated. Accordingly, an internal pressure and a temperature in combustion chamber S1 increase.

Then, as the internal pressure in combustion chamber S1 reaches a prescribed pressure, a portion of partition member 70A where score 70a is provided is broken. Thus, as shown in FIG. 4, communication hole 73 is provided in partition member 70A in a portion opposed to hollow portion 81 of filter 80 and combustion chamber S1 and filter chamber S2 communicate with each other through communication hole 73. Since sealed container 50A is sufficiently lower in mechanical strength than partition member 70A as described above, top wall portion 51a of sealed container 50A also simultaneously burst and opens owing to impact of burst of partition member 70A.

As communication hole 73 is provided in partition member 70A, the gas generated in combustion chamber S1 flows into filter chamber S2. The gas which has flowed into filter chamber S2 flows along the axial direction through hollow portion 81 of filter 80, thereafter changes a direction to the radial direction, and passes through filter 80. The gas is cooled as it is deprived of heat by filter 80 and slag contained in the gas is removed by filter 80.

The portion of top wall portion 51a of cup body 51 which abuts on filter 80 remains without bursting. Thrust of gas generated in combustion chamber S1 is applied in the radial direction to the remaining portion of top wall portion M a through the burst portion in partition member 70A. Therefore, that portion is strongly pressed against the inner circumferential surface of housing main body 10 and comes in intimate contact therewith. Since there is no gap between the remaining portion of top wall portion M a and housing main body 10, leakage of the gas through that portion can also be prevented.

The gas which has passed through filter 80 is discharged to the outside of the housing through gas discharge opening 11. The discharged gas is introduced into an air bag provided adjacently to cylinder type gas generator 1A to thereby expand and develop the air bag.

In cylinder type gas generator 1A in the present embodiment described above, an opening pressure at the time when combustion chamber S1 is opened upon activation (that is, combustion chamber S1 and filter chamber S2 communicate with each other) can be determined by partition member 70A higher in mechanical strength than sealed container 50A. Therefore, the opening pressure can be higher than in a cylinder type gas generator constructed such that the opening pressure is determined only by a part of a sealed container without providing a partition member, and a state at a high temperature and a high pressure suitable for burning of gas generating agent 60 in combustion chamber S1 can be maintained. Therefore, sustained burning of gas generating agent 60 can be achieved, a harmful component such as carbon monoxide contained in emitted gas can also be reduced, and consequently sufficient and satisfactory gas output is obtained.

Since the opening pressure described above can variously be modified by adjusting a thickness of partition member 70A or a shape and a size of score 70a, optimization thereof in accordance with gas generating agent 60 that is used can also be facilitated. Therefore, a cylinder type gas generator higher in performance than in the conventional example can also be provided.

Additionally, since cylinder type gas generator 1A in the present embodiment described above is constructed such that gas generating agent 60 is hermetically sealed from the outside by being accommodated in sealed container 50A, absorption of moisture by gas generating agent 60 can be prevented without adopting a complicated sealing structure including an O ring or the like in the housing. Therefore, an assembly operation is facilitated and thus manufacturing cost can also be suppressed.

The sealed container itself can also be made of a member high in mechanical strength and the opening pressure can also be determined by a part of the sealed container high in mechanical strength. With such a construction, however, a weight of the sealed container significantly increases and reduction in weight of the cylinder type gas generator cannot sufficiently be achieved. In addition, since a relatively large sealed container should be made by using a member high in mechanical strength, manufacturing cost is increased.

In contrast, in cylinder type gas generator 1A in the present embodiment described above, only a minimum necessary portion to function as a pressure bulkhead is made of a member relatively high in mechanical strength and sealed container 50A of which sealability should be ensured is made of a member relatively low in mechanical strength, which not only leads to an effect of significant reduction in weight but also to reduction in manufacturing cost.

As set forth above, with cylinder type gas generator 1A in the present embodiment, a cylinder type gas generator which can be reduced in size and weight and can allow significant suppression in manufacturing cost without lowering in performance and for which a sealing process for preventing absorption of moisture by gas generating agent 60 is easily performed can be obtained.

(First Modification)

Figure 5:
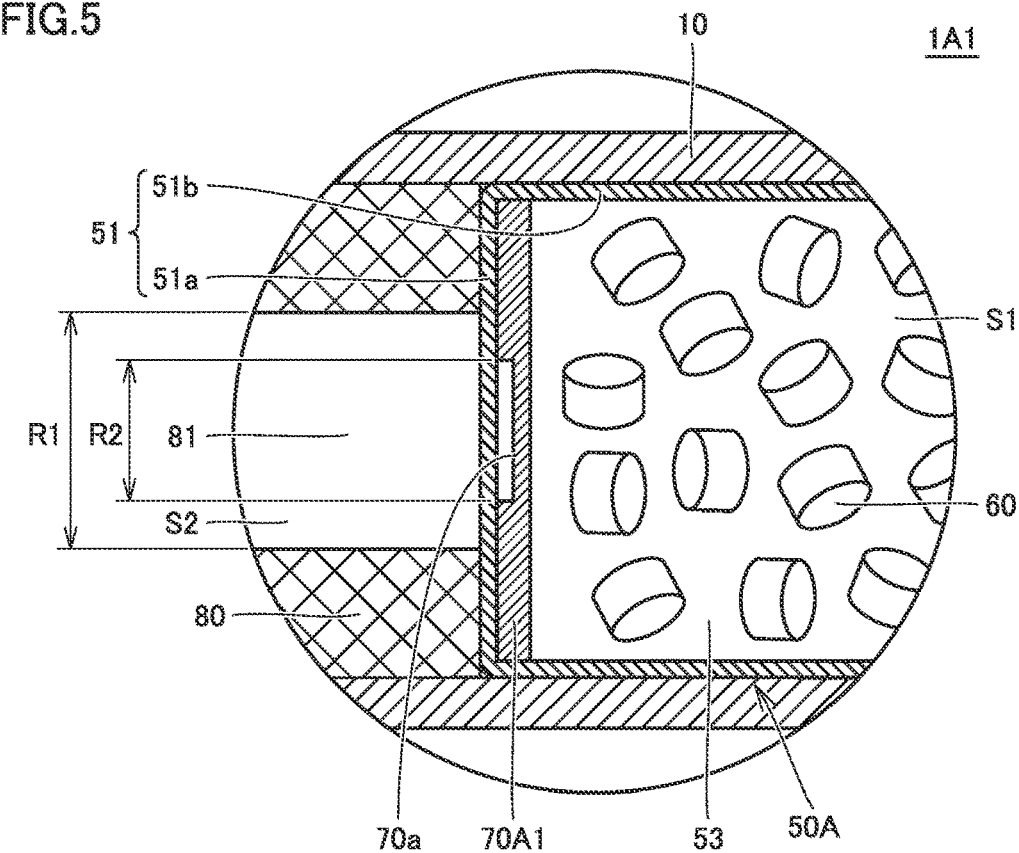
FIG. 5 is an enlarged cross-sectional view of a main portion of a cylinder type gas generator according to a first modification.
Figure 6:
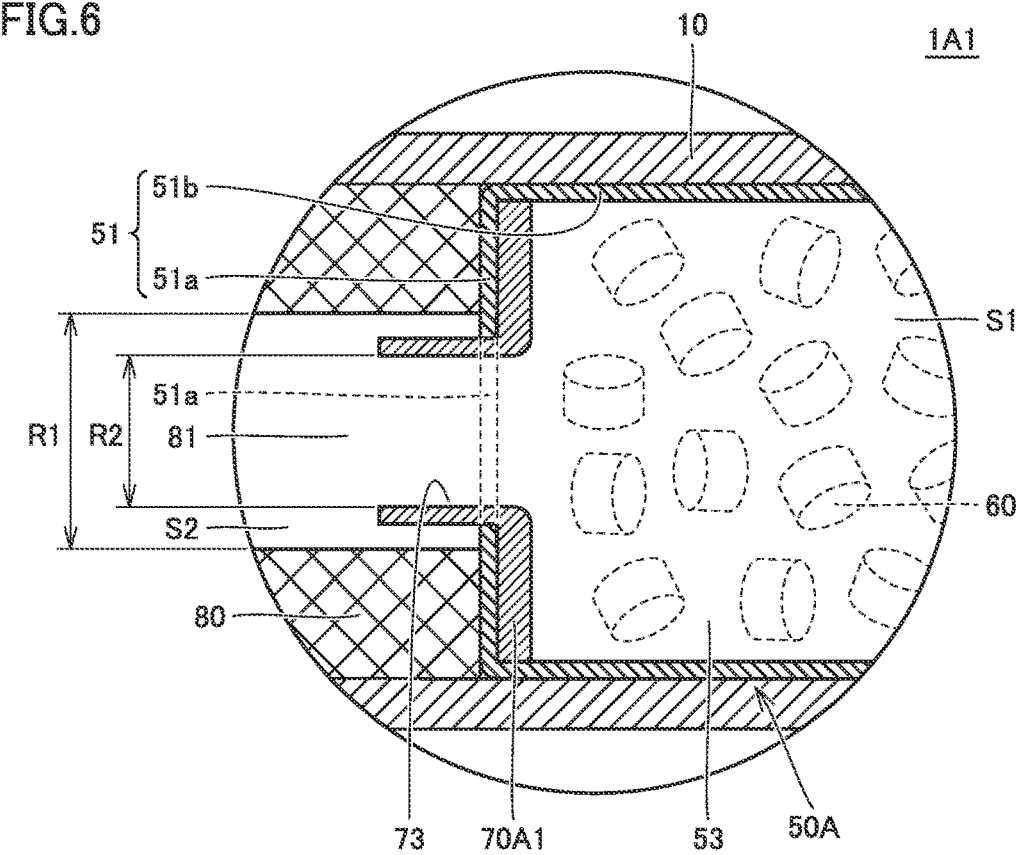
FIG. 6 is an enlarged cross-sectional view of the main portion showing a state at the time of activation of the cylinder type gas generator shown in FIG. 5.

FIG. 5 is an enlarged cross-sectional view of a main portion of a cylinder type gas generator according to a first modification based on the present embodiment and FIG. 6 is an enlarged cross-sectional view of the main portion showing a state at the time of activation of the cylinder type gas generator shown in FIG. 5. A cylinder type gas generator 1A1 according to the first modification based on the present embodiment will be described below with reference to FIGS. 5 and 6. Cylinder type gas generator 1A1 according to the present first modification shows one example in which an opening pressure is varied in cylinder type gas generator 1A in the present embodiment described above.

As shown in FIG. 5, cylinder type gas generator 1A1 according to the first modification is different from cylinder type gas generator 1A described above only in including a partition member 70A1 different in size of score 70a.

More specifically, a diameter R2 of score 70a is set to be smaller than a diameter R1 of hollow portion 81 (R2>R1), where R1 represents a diameter of hollow portion 81 of filter 80 and R2 represents a diameter of score 70a.

According to such a construction, as shown in FIG. 6, communication hole 73 provided in partition member 70A1 upon activation is sufficiently smaller in size than hollow portion 81. Therefore, an opening pressure can freely be set without changing a size of hollow portion 81 of filter 80 by variously changing a size of score 70a provided in partition member 70A1 within a range smaller than the diameter of hollow portion 81. Furthermore, a combustion pressure in combustion chamber S1 can also be controlled based on a size of communication hole 73.

Examples of other factors for changing an opening pressure and a combustion pressure include a thickness of the partition member or a shape of the score as described above, and in addition, also include a material for the partition member or a size of the hollow portion of the filter.

(Second Modification)

Figure 7:
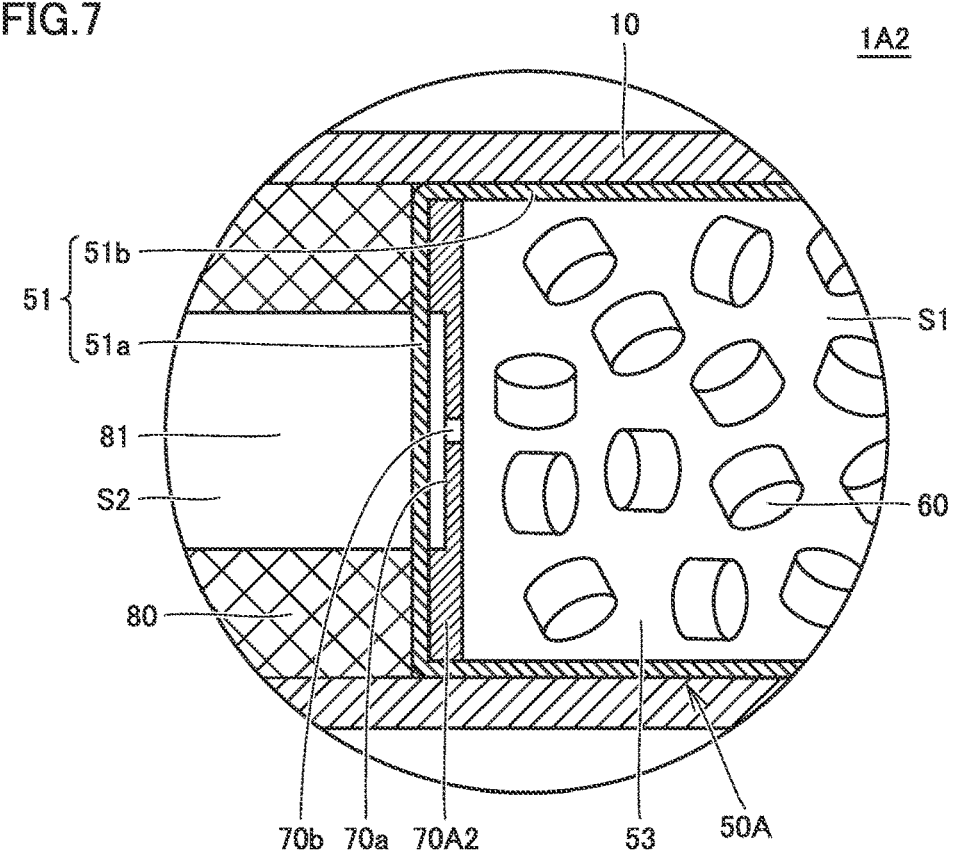
FIG. 7 is an enlarged cross-sectional view of a main portion of a cylinder type gas generator according to a second modification.

FIG. 7 is an enlarged cross-sectional view of a main portion of a cylinder type gas generator according to a second modification based on the present embodiment. A cylinder type gas generator 1A2 according to the second modification based on the present embodiment will be described below with reference to FIG. 7.

As shown in FIG. 7, cylinder type gas generator 1A2 according to the second modification is different from cylinder type gas generator 1A described above only in including a partition member 70A2 different in construction.

Specifically, partition member 70A2 has a through hole 70b provided in a bottom portion of score 70a, in addition to score 70a.

When through hole 70b is thus provided in partition member 70A2, a portion where score 70a is provided can reliably be broken, with such break originating from a portion where through hole 70b is provided. Therefore, a more stable operation is realized and output characteristics can be stabilized. A state of partition member 70A2 and the vicinity thereof at the time of activation of cylinder type gas generator 1A2 according to the present second modification is substantially the same as in cylinder type gas generator 1A shown in FIG. 4.

(Third Modification)

Figure 8:
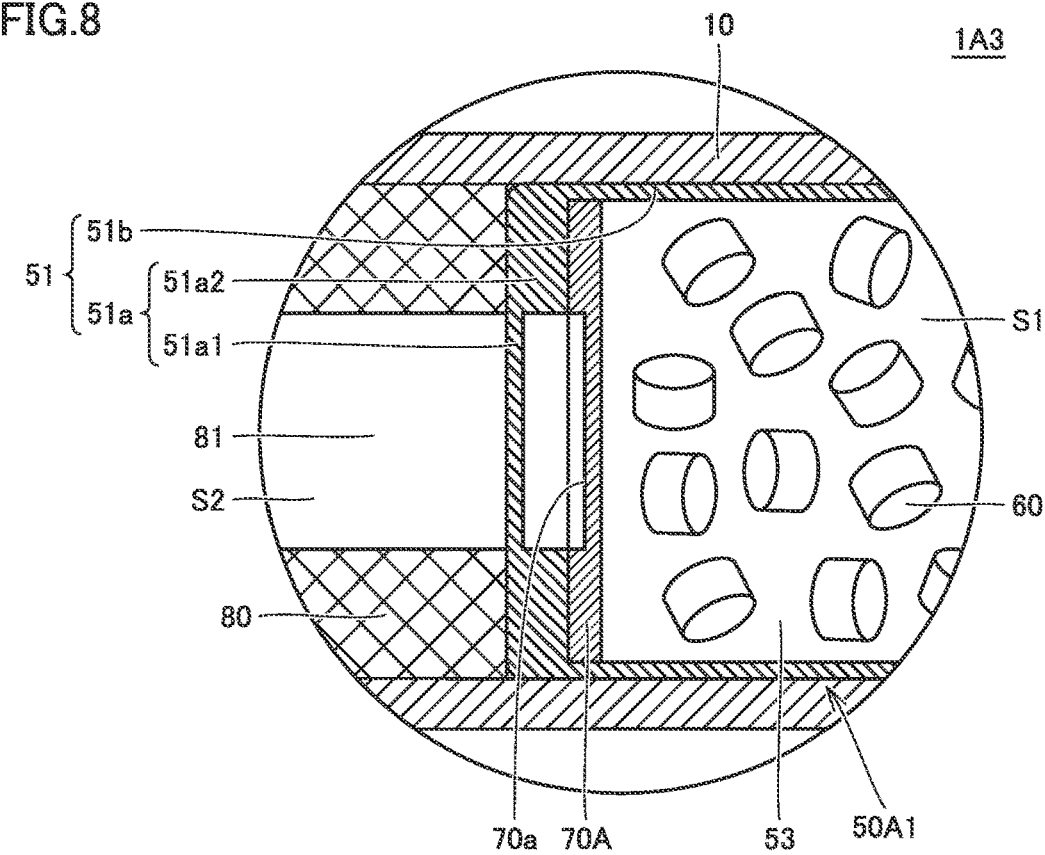
FIG. 8 is an enlarged cross-sectional view of a main portion of a cylinder type gas generator according to a third modification.
Figure 9:
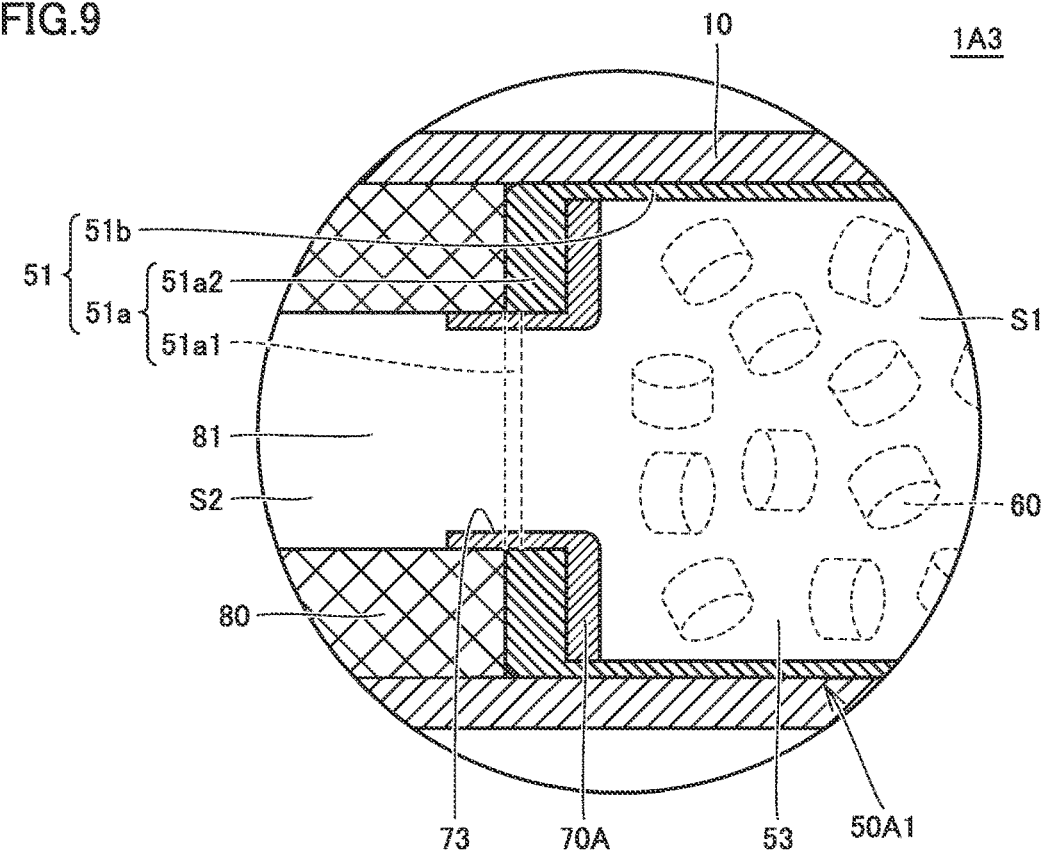
FIG. 9 is an enlarged cross-sectional view of the main portion showing a state at the time of activation of the cylinder type gas generator shown in FIG. 8.

FIG. 8 is an enlarged cross-sectional view of a main portion of a cylinder type gas generator according to a third modification based on the present embodiment and FIG. 9 is an enlarged cross-sectional view of the main portion showing a state at the time of activation of the cylinder type gas generator shown in FIG. 8. A cylinder type gas generator 1A3 according to the third modification based on the present embodiment will be described below with reference to FIGS. 8 and 9.

As shown in FIG. 8, cylinder type gas generator 1A3 according to the third modification is different from cylinder type gas generator 1A described above only in including a sealed container 50A1 different in construction.

Specifically, sealed container 50A1 includes a small-thickness portion 51a1 relatively smaller in thickness and a large-thickness portion 51a2 relatively greater in thickness in top wall portion 51a of cup body 51.

Small-thickness portion 51a1 is located in a portion opposed to hollow portion 81 of filter 80 and large-thickness portion 51a2 is located in a portion opposed to the axial end surface except for hollow portion 81 of filter 80. When top wall portion 51a of cup body 51 and filter 80 are projected on a surface orthogonal to the axial direction of housing main body 10 along the axial direction, a boundary between small-thickness portion 51a1 and large-thickness portion 51a2 matches with an inner edge of a portion except for hollow portion 81 of filter 80 (that is, an outer edge of hollow portion 81). Large-thickness portion 51a2 is thus opposed to an outer edge portion of the axial end surface of filter 80 located on the side of combustion chamber S1.

Small-thickness portion 51a1 is formed to sufficiently be small in thickness so as to similarly burst along with burst of partition member 70A, and a thickness thereof is set, for example, to be not smaller than 0.1 [mm] and not greater than 1.0 [mm] when sealed container 50A1 is made of an aluminum alloy. Large-thickness portion 51a2 is formed to be greater in thickness than small-thickness portion 51a1 so as not to burst and melt even though gas generating agent 60 is burnt, and a thickness thereof is set, for example, to be not smaller than 0.4 [mm] and not greater than 4.0 [mm] when sealed container 50A1 is made of an aluminum alloy.

According to such a construction, as shown in FIG. 9, large-thickness portion 51a2 remains after activation and there is no gap between large-thickness portion 51a2 and housing main body 10. Therefore, leakage of gas through that portion can be prevented.

When a construction as in the present third modification is adopted, an intimate contact portion can be formed along the axial direction of housing main body 10, which is longer by a thickness of large-thickness portion 51*a*2 which is a remaining portion of top wall portion 51*a* of cup body 51 than in cylinder type gas generator 1A in the present embodiment described above. Leakage of gas through that portion can thus further reliably be prevented.

(Fourth Modification)

Figure 10:
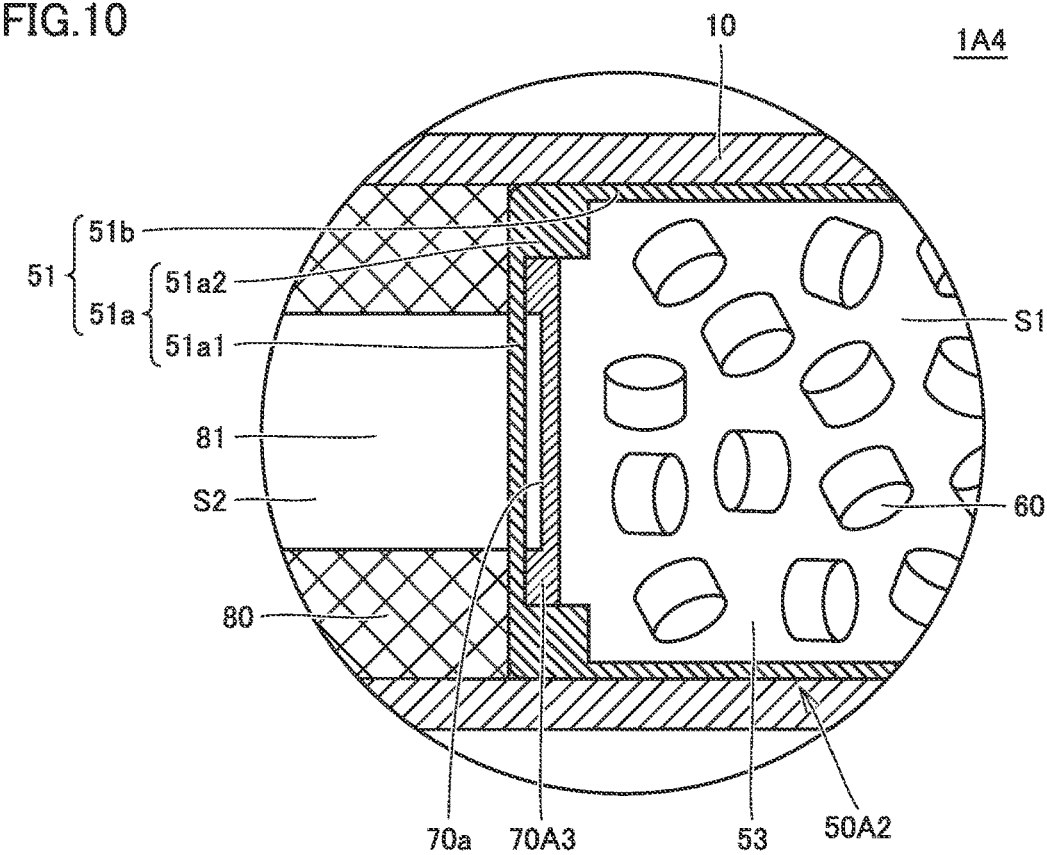
FIG. 10 is an enlarged cross-sectional view of a main portion of a cylinder type gas generator according to a fourth modification.
Figure 11:
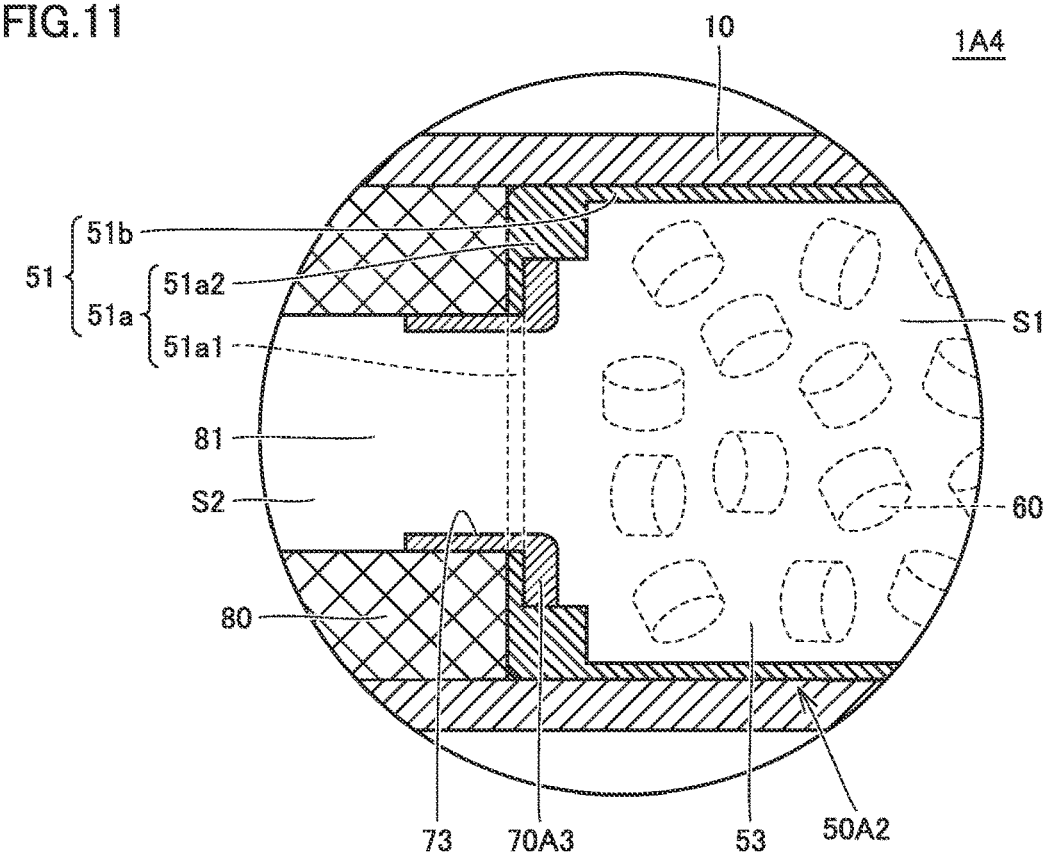
FIG. 11 is an enlarged cross-sectional view of the main portion showing a state at the time of activation of the cylinder type gas generator shown in FIG. 10.

FIG. 10 is an enlarged cross-sectional view of a main portion of a cylinder type gas generator according to a fourth modification based on the present embodiment and FIG. 11 is an enlarged cross-sectional view of the main portion showing a state at the time of activation of the cylinder type gas generator shown in FIG. 10. A cylinder type gas generator 1A4 according to the fourth modification based on the present embodiment will be described below with reference to FIGS. 10 and 11.

As shown in FIG. 10, cylinder type gas generator 1A4 according to the fourth modification is different from cylinder type gas generator 1A3 described above only in including a sealed container 50A2 different in construction and a partition member 70A3 different in construction.

Specifically, as compared with sealed container 50A1 described above, sealed container 50A2 is provided such that an outer edge portion of small-thickness portion 51*a*1 is constructed to be greater so as to reach the axial end surface of filter 80 and large-thickness portion 51*a*2 is opposed only to the outer edge portion of the axial end surface of filter 80.

Partition member 70A3 is constructed to be smaller in size in a radial direction than partition member 70A described above, and fitted into a recess provided in an inner surface of top wall portion 51*a* of cup body 51 (a stepped portion produced as a result of formation of small-thickness portion 51*a*1 and large-thickness portion 51*a*2 described above in top wall portion 51*a*).

According to such a construction as well, as shown in FIG. 11, large-thickness portion 51*a*2 remains after activation and there is no gap between large-thickness portion 51*a*2 and housing main body 10. Therefore, leakage of gas through that portion can reliably be prevented.

Second Embodiment

Figure 12:
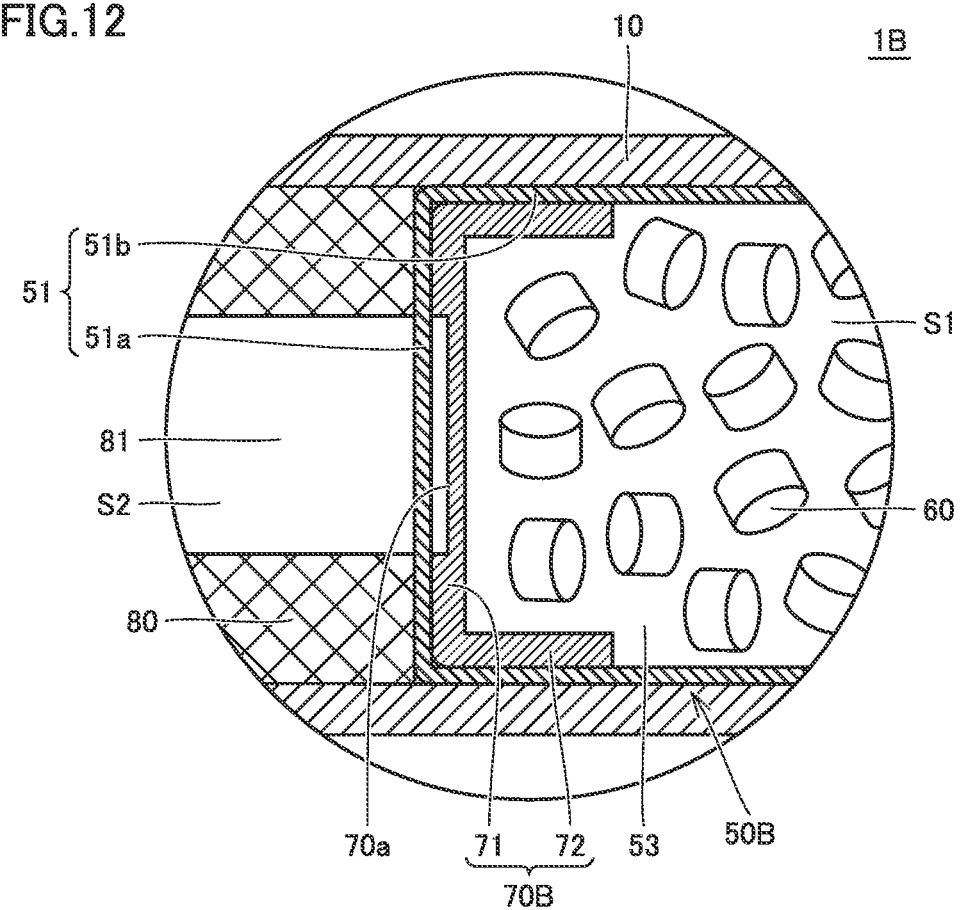
FIG. 12 is an enlarged cross-sectional view of a main portion of a cylinder type gas generator in a second embodiment of the present invention.
Figure 13:
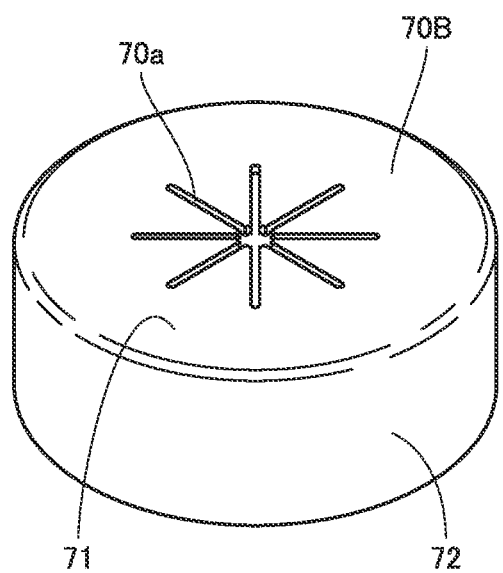
FIG. 13 is a perspective view of a partition member shown in FIG. 12.
Figure 14:
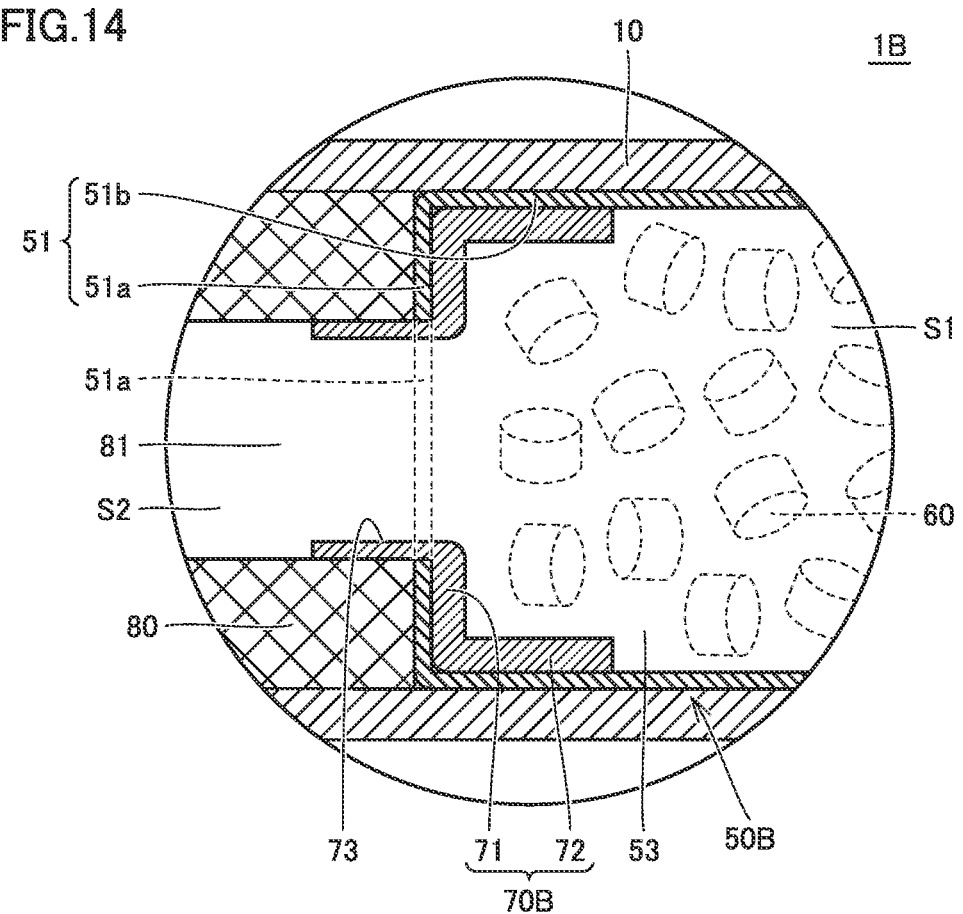
FIG. 14 is an enlarged cross-sectional view of the main portion showing a state at the time of activation of the cylinder type gas generator shown in FIG. 12.

FIG. 12 is an enlarged cross-sectional view of a main portion of a cylinder type gas generator in a second embodiment of the present invention. FIG. 13 is a perspective view of a partition member shown in FIG. 12 and FIG. 14 is an enlarged cross-sectional view of the main portion showing a state at the time of activation of the cylinder type gas generator shown in FIG. 12. A cylinder type gas generator 1B in the present embodiment will be described below with reference to FIGS. 12 to 14.

As shown in FIGS. 12 and 13, cylinder type gas generator 1B in the present embodiment is different from cylinder type gas generator 1A in the first embodiment described above only in including a partition member 70B different in construction. A sealed container SOB provided in cylinder type gas generator 1B in the present embodiment is basically similar in construction to sealed container 50A in the first embodiment described above.

Specifically, partition member 70B is in a shape of a cup and has a top plate portion 71 and a side plate portion 72. Top plate portion 71 is in a shape of a circular flat plate in a plan view and side plate portion 72 is in a shape of a cylindrical wall erected from an outer edge portion of top plate portion 71.

Partition member 70B is made of a member composed of a material higher in mechanical strength than sealed container 50B, and specifically, it is preferably made of iron or an iron alloy such as stainless steel or iron steel.

Partition member 70B is arranged at the end portion on the side of filter chamber S2 in accommodation space 53 in sealed container 50B. More specifically, partition member 70B is arranged such that an outer main surface of top plate portion 71 abuts on top wall portion 51*a* of sealed container 50B and an outer circumferential surface of side plate portion 72 abuts on sidewall portion 51*b* of sealed container 50B.

Score 70*a* is provided in the outer main surface of top plate portion 71 of partition member 70B. Score 70*a* is provided for causing desired change in shape of partition member 70B with increase in internal pressure in combustion chamber S1 as a result of burning of gas generating agent 60 (that is, such change in form that communication hole 73 (see FIG. 14) which will be described later is provided as a result of burst of a part of partition member 70B), and it is provided, for example, as a plurality of grooves provided to radially intersect with one another. Score 70*a* is provided in a portion of partition member 70B opposed to hollow portion 81 of filter 80.

As shown in FIG. 14, when cylinder type gas generator 1B is activated, a portion of partition member 70B where score 70*a* is provided is broken as the internal pressure in combustion chamber S1 reaches a prescribed pressure. Communication hole 73 is thus provided in partition member 70B in a portion opposed to hollow portion 81 of filter 80 and combustion chamber S1 and filter chamber S2 communicate with each other through communication hole 73. Since sealed container 50B is sufficiently lower in mechanical strength than partition member 70B as described above, top plate portion 71 of sealed container 50B also simultaneously bursts and opens owing to impact of burst of partition member 70B.

In cylinder type gas generator 1B in the present embodiment thus constructed as well, an opening pressure at the time when combustion chamber S1 is opened upon activation (that is, combustion chamber S1 and filter chamber S2 communicate with each other) can be determined by partition member 70B higher in mechanical strength than sealed container 50B. Therefore, an effect the same as in the first embodiment described above can be obtained.

By employing partition member 70B in the cup shape as in the present embodiment, thrust of gas generated in combustion chamber S1 is applied in the radial direction to side plate portion 72 of partition member 70B at the time of activation. Therefore, side plate portion 72 is strongly pressed against the inner circumferential surface of housing main body 10 and comes in intimate contact therewith with sidewall portion 51*b* of sealed container 50B being interposed. Since there is no gap between side plate portion 72 and housing main body 10, leakage of the gas through that portion can also reliably be prevented.

Third Embodiment

Figure 15:
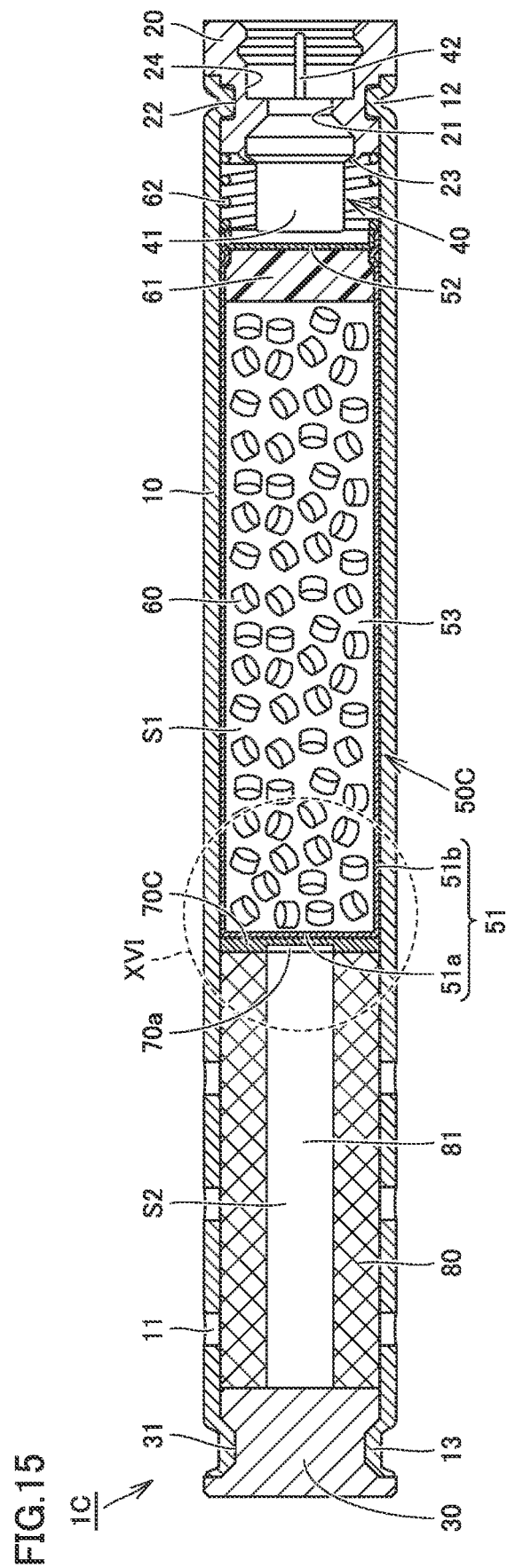
FIG. 15 is a schematic diagram of a cylinder type gas generator in a third embodiment of the present invention.
Figure 16:
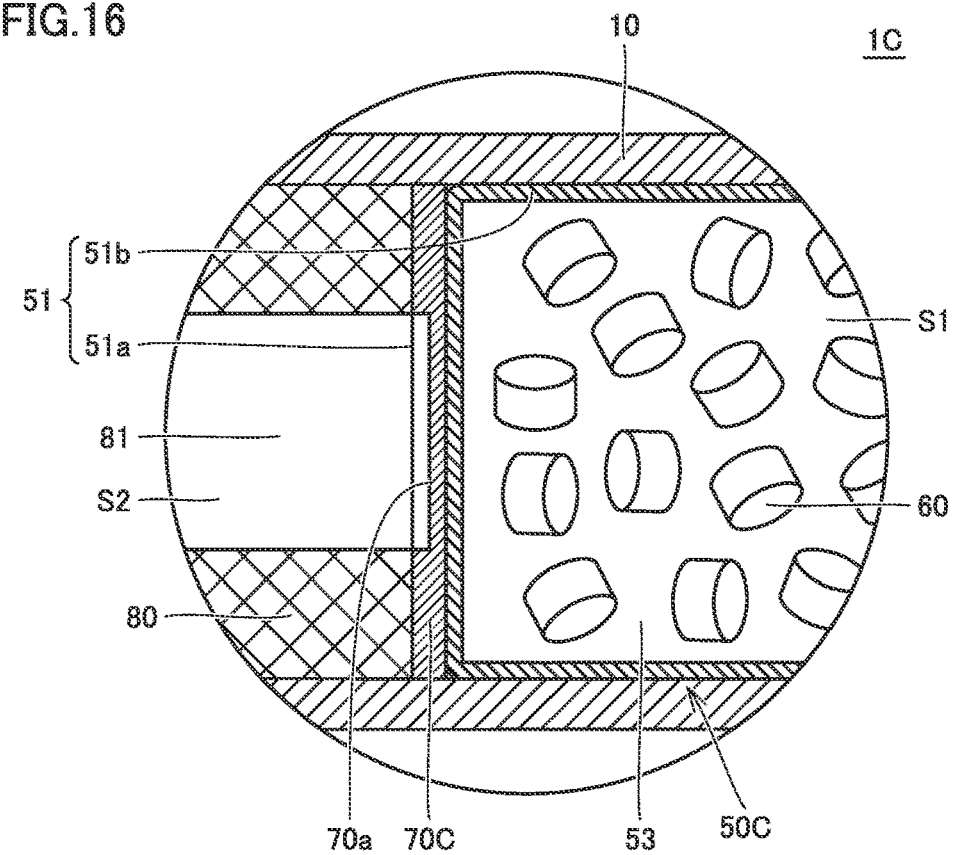
FIG. 16 is an enlarged cross-sectional view of a main portion of the cylinder type gas generator shown in FIG. 15.
Figure 17:
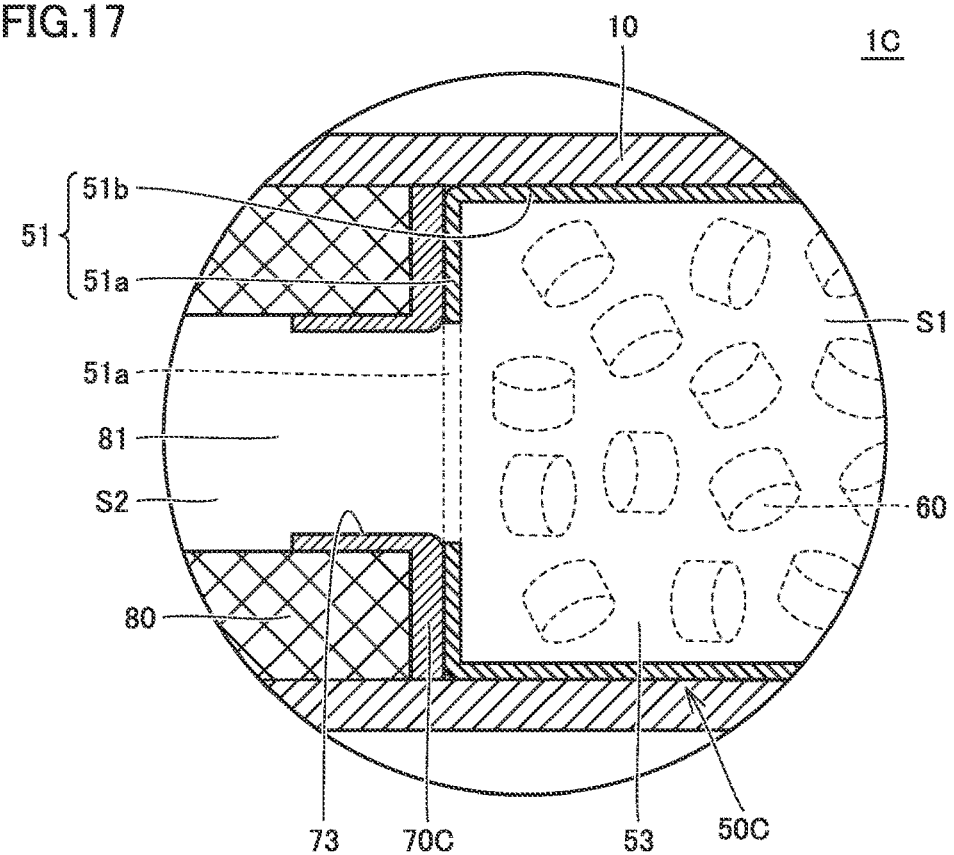
FIG. 17 is an enlarged cross-sectional view of the main portion showing a state at the time of activation of the cylinder type gas generator shown in FIG. 15.

FIG. 15 is a schematic diagram of a cylinder type gas generator in a third embodiment of the present invention. FIG. 16 is an enlarged cross-sectional view of a main portion of the cylinder type gas generator shown in FIG. 15 and FIG. 17 is an enlarged cross-sectional view of the main portion showing a state at the time of activation of the cylinder type gas generator shown in FIG. 15. A cylinder type gas generator 1C in the present embodiment will be described below with reference to FIGS. 15 to 17.

As shown in FIGS. 15 and 16, cylinder type gas generator 1C in the present embodiment is different from cylinder type gas generator 1A in the first embodiment described above only in including a partition member 70C different in position of placement, although the construction thereof is basically the same. A sealed container 50C provided in cylinder type gas generator 1C in the present embodiment is basically similar in construction to sealed container 50A in the first embodiment described above.

Specifically, partition member 70C is not accommodated in sealed container 50C but arranged outside sealed container 50C. More specifically, partition member 70C is arranged such that a main surface thereof abuts on the axial end surface of filter 80 located on the side of combustion chamber S1 and a circumferential surface thereof abuts on the inner circumferential surface of the circumferential wall portion of housing main body 10.

An axial end portion of sealed container 50C located on the side of filter chamber S2 abuts on partition member 70C. Partition member 70C is thus disposed as lying between filter 80 and sealed container 50C. Score 70a is located in a main surface of partition member 70C located on the side of filter chamber S2.

As shown in FIG. 17, when cylinder type gas generator 1C is activated, top wall portion 51a of sealed container 50C bursts or melts with increase in internal pressure and temperature of combustion chamber S1, and a portion of partition member 70C where score 70a is provided is broken as the internal pressure in combustion chamber S1 reaches a prescribed pressure. Communication hole 73 is thus provided in partition member 70C in a portion opposed to hollow portion 81 of filter 80, and combustion chamber S1 and filter chamber S2 communicate with each other through communication hole 73.

In cylinder type gas generator 1C in the present embodiment thus constructed as well, an opening pressure at the time when combustion chamber S1 is opened upon activation (that is, combustion chamber S1 and filter chamber S2 communicate with each other) can be determined by partition member 70C higher in mechanical strength than sealed container 50C. Therefore, an effect the same as in the first embodiment described above can be obtained.

(Fifth Modification)

Figure 18:
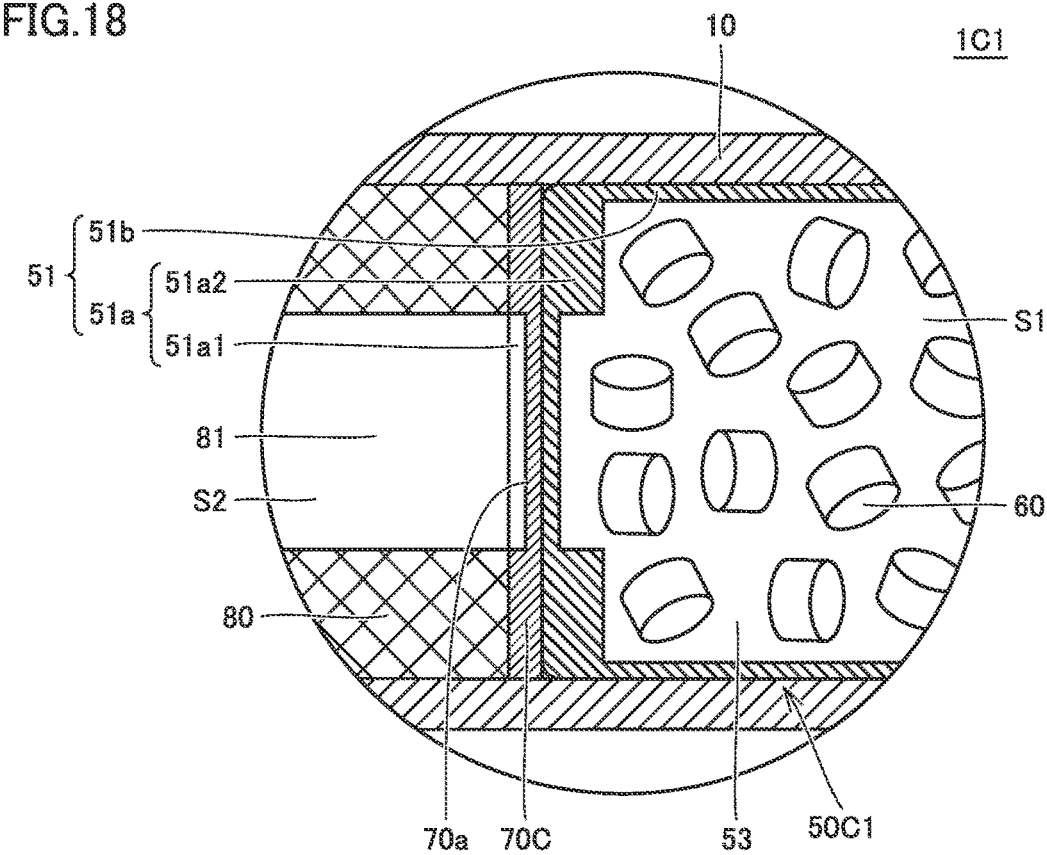
FIG. 18 is an enlarged cross-sectional view of a main portion of a cylinder type gas generator according to a fifth modification.
Figure 19:
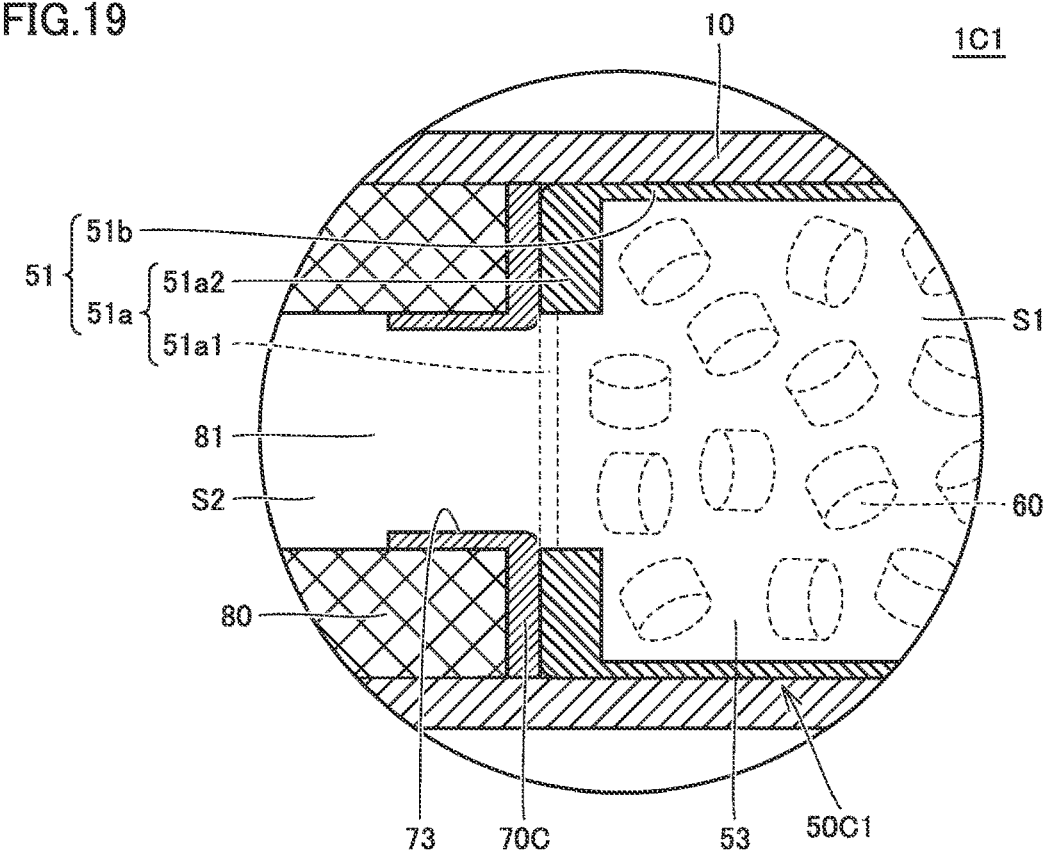
FIG. 19 is an enlarged cross-sectional view of the main portion showing a state at the time of activation of the cylinder type gas generator shown in FIG. 18.

FIG. 18 is an enlarged cross-sectional view of a main portion of a cylinder type gas generator according to a fifth modification based on the present embodiment and FIG. 19 is an enlarged cross-sectional view of the main portion showing a state at the time of activation of the cylinder type gas generator shown in FIG. 18. A cylinder type gas generator 1C1 according to the fifth modification based on the present embodiment will be described below with reference to FIGS. 18 and 19.

As shown in FIG. 18, cylinder type gas generator 1C1 according to the fifth modification is different from cylinder type gas generator 1C described above only in including a sealed container 50C1 different in construction.

Specifically, sealed container 50C1 includes small-thickness portion 51a1 relatively smaller in thickness and a large-thickness portion 51a2 relatively greater in thickness in top wall portion 51a of cup body 51.

Small-thickness portion 51a1 is located in a portion opposed to hollow portion 81 of filter 80 and large-thickness portion 51a2 is located in a portion opposed to the axial end surface except for hollow portion 81 of filter 80. When top wall portion 51a of cup body 51 and filter 80 are projected on a surface orthogonal to the axial direction of housing main body 10 along the axial direction, a boundary between small-thickness portion 51a1 and large-thickness portion 51a2 matches with the inner edge of the portion except for hollow portion 81 of filter 80 (that is, the outer edge of hollow portion 81). Large-thickness portion 51a2 is thus opposed to the outer edge portion of the axial end surface of filter 80 located on the side of combustion chamber S1.

Small-thickness portion 51a1 is formed to sufficiently be small in thickness so as to similarly burst along with burst of partition member 70C, and a thickness thereof is set, for example, to be not smaller than 0.1 [mm] and not greater than 1.0 [mm] when sealed container 50C1 is made of an aluminum alloy. Large-thickness portion 51a2 is formed to be greater in thickness than small-thickness portion 51a1 so as not to burst and melt even though gas generating agent 60 is burnt, and a thickness thereof is set, for example, to be not smaller than 0.4 [mm] and not greater than 4.0 [mm] when sealed container 50C1 is made of an aluminum alloy.

According to such a construction, as shown in FIG. 19, large-thickness portion 51a2 remains after activation and there is no gap between large-thickness portion 51a2 and housing main body 10. Therefore, leakage of gas through that portion can be prevented.

When a construction as in the present fifth modification is adopted, an intimate contact portion can be formed along the axial direction of housing main body 10, which is longer by a thickness of large-thickness portion 51a2 which is a remaining portion of top wall portion 51a of cup body 51 than in cylinder type gas generator 1C in the present embodiment described above. Leakage of gas through that portion can thus further reliably be prevented.

Fourth Embodiment

Figure 20:
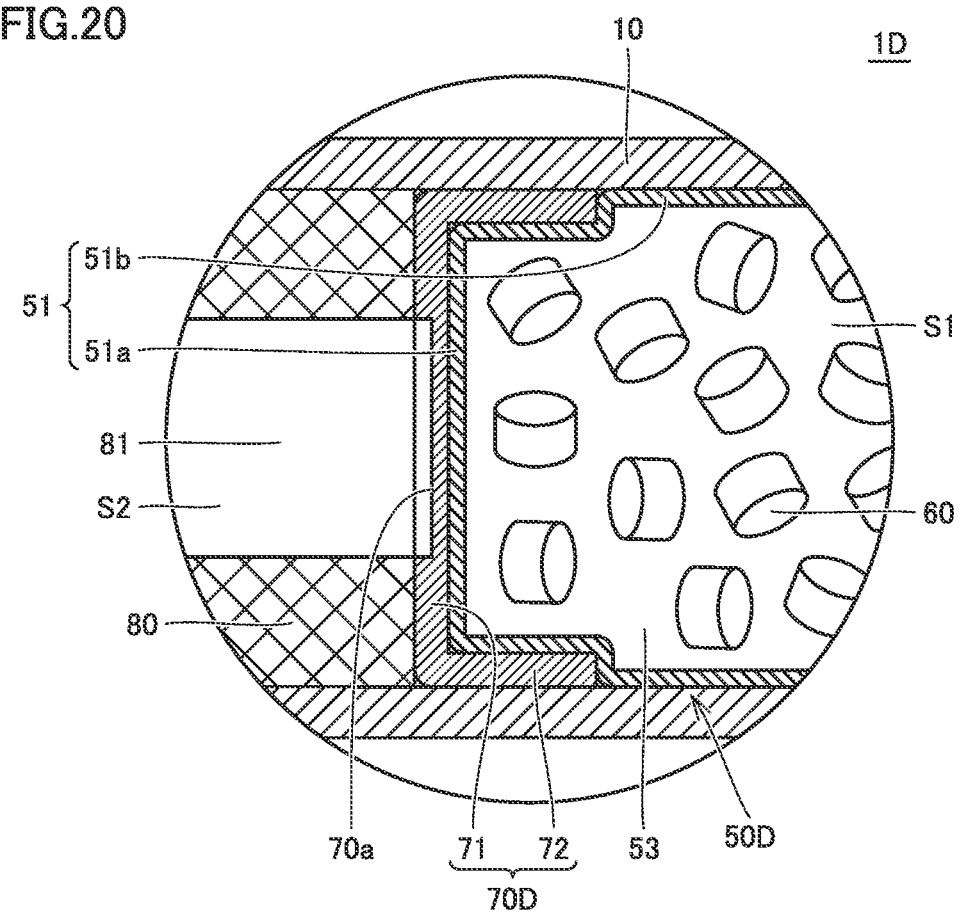
FIG. 20 is an enlarged cross-sectional view of a main portion of a cylinder type gas generator in a fourth embodiment of the present invention.
Figure 21:
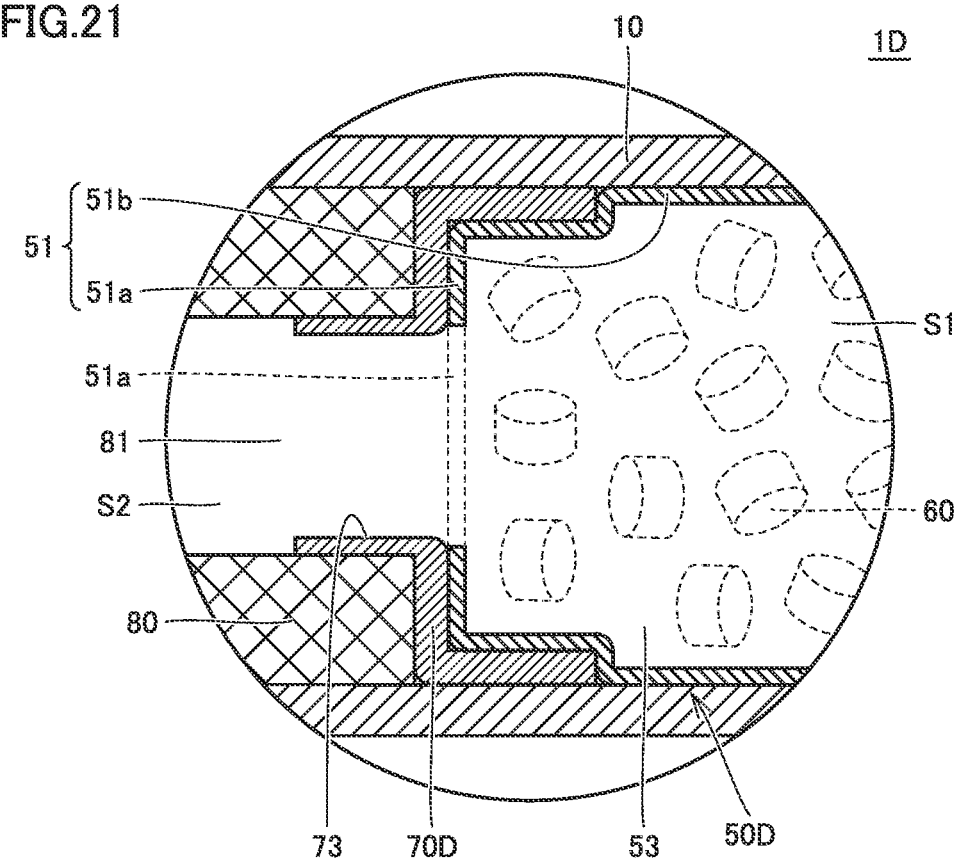
FIG. 21 is an enlarged cross-sectional view of the main portion showing a state at the time of activation of the cylinder type gas generator shown in FIG. 20.

FIG. 20 is an enlarged cross-sectional view of a main portion of a cylinder type gas generator in a fourth embodiment of the present invention and FIG. 21 is an enlarged cross-sectional view of the main portion showing a state at the time of activation of the cylinder type gas generator shown in FIG. 20. A cylinder type gas generator 1D in the present embodiment will be described below with reference to FIGS. 20 and 21.

As shown in FIG. 20, cylinder type gas generator 1D in the present embodiment is different from cylinder type gas generator 1C in the third embodiment described above only in including a partition member 70D different in construction and a sealed container 50D different in construction.

Specifically, partition member 70D is in a shape of a cup and has top plate portion 71 and side plate portion 72. Top plate portion 71 is in a shape of a circular flat plate in a plan view and side plate portion 72 is in a shape of a cylindrical wall erected from the outer edge portion of top plate portion 71.

Partition member 70D is made of a member composed of a material higher in mechanical strength than sealed container 50D, and specifically, it is preferably made of iron or an iron alloy such as stainless steel or iron steel.

Partition member 70D is arranged such that the outer main surface of top plate portion 71 abuts on the axial end surface of filter 80 located on the side of combustion chamber S1 and the outer circumferential surface of side plate portion 72 abuts on the inner circumferential surface of the circumferential wall portion of housing main body 10.

Sealed container 50D has a tip end portion slightly smaller in size such that an end portion thereof on the side of filter chamber S2 is stepped, and the tip end portion is inserted in partition member 70D. The axial end portion of sealed container 50D located on the side of filter chamber S2 thus abuts on partition member 70D and partition member 70D lies between filter 80 and sealed container 50D.

Score 70a is provided in the outer main surface of top plate portion 71 of partition member 70D. Score 70a is provided for causing desired change in shape of partition member 70D with increase in internal pressure in combustion chamber S1 as a result of burning of gas generating agent 60 (that is, such change in form that communication hole 73 (see FIG. 21) which will be described later is provided as a result of burst of a part of partition member 70D), and it is provided, for example, as a plurality of grooves provided to radially intersect with one another. Score 70a is provided in a portion of partition member 70D opposed to hollow portion 81 of filter 80.

As shown in FIG. 21, when cylinder type gas generator 1D is activated, top wall portion 51a of sealed container 50D bursts or melts with increase in internal pressure and temperature of combustion chamber S1 and a portion of partition member 70D where score 70a is provided is broken as the internal pressure in combustion chamber S1 reaches a prescribed pressure. Communication hole 73 is thus provided in partition member 70D in a portion opposed to hollow portion 81 of filter 80 and combustion chamber S1 and filter chamber S2 communicate with each other through communication hole 73.

In cylinder type gas generator 1D in the present embodiment thus constructed as well, an opening pressure at the time when combustion chamber S1 is opened upon activation (that is, combustion chamber S1 and filter chamber S2 communicate with each other) can be determined by partition member 70D higher in mechanical strength than sealed container 50D. Therefore, an effect the same as in the third embodiment described above can be obtained.

By employing partition member 70D in the cup shape as in the present embodiment, thrust of gas generated in combustion chamber S1 is applied in the radial direction to side plate portion 72 of partition member 70D at the time of activation with sidewall portion 51b of sealed container 50D being interposed. Therefore, side plate portion 72 is strongly pressed against the inner circumferential surface of housing main body 10 and comes in intimate contact therewith. Since there is no gap between side plate portion 72 and housing main body 10, leakage of the gas through that portion can also reliably be prevented.

Though description has been given in the first to fourth embodiments and the modifications thereof of the present invention described above with reference to an example in which a score is provided in the partition member, the score is not necessarily an essential feature, and a partition member may be made of a member simply in a shape of a flat plate or a member in a cup shape without a score. In that case as well, a portion of the partition member opposed to the hollow portion of the filter can burst with increase in internal pressure in the combustion chamber and thus an opening pressure described above can be controlled.

Though description has been given in the first to fourth embodiments and the modifications thereof of the present invention described above with reference to an example in which a score is provided in a main surface of the partition member located on a side of the filter chamber, the score may be provided in a main surface of the partition member located on a side of the combustion chamber or in a pair of main surfaces.

Though description has been given in the first to fourth embodiments and the modifications thereof of the present invention described above with reference to an example in which only an ignition agent is loaded or an ignition agent and an enhancer agent are loaded in the ignition portion of the igniter, in loading an enhancer agent, the enhancer agent does not necessarily have to be loaded in the ignition portion of the igniter, but may be loaded at a position between the ignition portion of the igniter and the gas generating agent, for example, with the use of a cup-shaped member or a container.

Though description has been given in the first to fourth embodiments and the modifications thereof of the present invention described above with reference to an example in which the housing main body and the holder are coupled to each other by fixing by caulking and the housing main body and the closing member are coupled to each other by fixing by caulking, welding can also naturally be made use of for fixing the housing main body and the holder to each other and/or fixing the housing main body and the closing member to each other.

Though description has been given in the first to fourth embodiments and the modifications thereof of the present invention described above with reference to an example in which the housing main body and the closing member are members separate from each other, by forming them integrally with each other, a portion of the housing other than the holder may be formed from a cylindrical member with bottom formed from a single member.

In addition, though description has been given in the first to fourth embodiments and the modifications thereof of the present invention described above with reference to an example in which the present invention is applied to a cylinder type gas generator incorporated in a side air bag apparatus, applications of the present invention are not limited thereto and the present invention can be applied also to a cylinder type gas generator incorporated in an air bag apparatus on a passenger's seat side, a curtain air bag apparatus, a knee air bag apparatus, or a seat cushion air bag apparatus or what is called a T-shaped gas generator having an elongated outer geometry similarly to the cylinder type gas generator.

Furthermore, characteristic features shown in the first to fourth embodiments and the modifications thereof of the present invention described above can naturally be combined with one another within the scope allowable in terms of construction of an apparatus.

The embodiments and the modifications thereof disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1A, 1A1 to 1A4, 1B, 1C, 1C1, 1D cylinder type gas generator; 10 housing main body; 11 gas discharge opening; 12, 13 caulking portion; 20 holder; 21 through portion; 22 annular groove portion; 23 caulking portion; 24 recess portion; 30 closing member; 31 annular groove portion; 40 igniter; 41 ignition portion; 42 terminal pin; 50A, 50A1, 50A2, 50B, 50C, 50C1, 50D sealed container; 51 cup body; 51a top wall portion; 51a1 small-thickness portion; 51a2 large-thickness portion; 51b sidewall portion; 52 cap body; 53 accommodation space; 60 gas generating agent; 61 cushion material; 62 coil spring; 70A, 70A1 to 70A3, 70B to 70D partition member; 70a score; 70b through hole; 71 top plate portion; 72 side plate portion; 73 communication hole; 80 filter; 81 hollow portion; S1 combustion chamber; and S2 filter chamber

The invention claimed is:

1. A gas generator comprising:
an elongated cylindrical housing containing a combustion chamber in which a gas generating agent is arranged and a filter chamber in which a filter is arranged and having one end portion and another end portion in an axial direction closed;
an igniter assembled to the one end portion of the housing, for burning the gas generating agent;
a partition member axially dividing a space in the housing so as to form the combustion chamber at a position on a side of the one end portion of the housing and to form the filter chamber at a position on a side of the other end portion of the housing; and
a sealed container accommodating the gas generating agent in a hermetically sealed state,
wherein
the partition member extends across an entirety of the space in the housing so as to completely divide the combustion chamber from the filter chamber,
the housing having in a portion defining the filter chamber, a gas discharge opening for discharging a gas to outside,
the filter having a hollow portion extending along the axial direction of the housing and reaching an axial end surface located on a side of the combustion chamber,
the sealed container being made of a member composed of a material lower mechanical strength than the partition member such that at least a part of a portion of the sealed container opposed to the hollow portion of the filter bursts or melts with increase in pressure or temperature of the combustion chamber as a result of the burning of the gas generating agent, and
the partition member is made of a member composed of a material higher in mechanical strength than the sealed container such that at least a part of a portion of the partition member opposed to the hollow portion of the filter bursts with increase in pressure in the combustion chamber as a result of the burning of the gas generating agent to provide a communication hole which allows communication between the combustion chamber and the filter chamber.

2. The gas generator according to claim 1, wherein
the partition member is in a shape of a cup including a top plate portion in a form of a flat plate and a side plate portion in a form of a cylindrical wall,
the top plate portion abuts on the axial end surface of the filter located on the side of the combustion chamber, and
the side plate portion abuts on a sidewall portion of the sealed container.

3. The gas generator according to claim 1, wherein
the partition member has a score in a portion opposed to the hollow portion of the filter.

4. The gas generator according to claim 1, wherein
the partition member is in a shape of a flat plate.

5. The gas generator according to claim 4, wherein
the axial end portion of the sealed container located on the side of the filter chamber includes a small-thickness portion relatively smaller in thickness and a large-thickness portion relatively greater in thickness,
the small-thickness portion is located at least in a portion opposed to the hollow portion of the filter, and
the large-thickness portion is located at least in a portion opposed to an outer edge portion of the axial end surface of the filter located on the side of the combustion chamber.

6. The gas generator according to claim 1, wherein
the partition member is arranged outside the sealed container so as to abut on the axial end surface of the filter located on the side of the combustion chamber, and
the sealed container is arranged such that an axial end portion located on the side of the filter chamber abuts on the partition member.

7. The gas generator according to claim 6, wherein
the axial end portion of the sealed container located on the side of the filter chamber includes a small-thickness portion relatively smaller in thickness and a large-thickness portion relatively greater in thickness,
the small-thickness portion is located at least in a portion opposed to the hollow portion of the filter, and
the large-thickness portion is located at least in a portion opposed to an outer edge portion of the axial end surface of the filter located on the side of the combustion chamber.

8. A gas generator comprising:
an elongated cylindrical housing containing a combustion chamber which a gas generating agent is arranged and a filter chamber in which a filter is arranged and having one end portion and another end portion in an axial direction closed;
an igniter assembled to the one end portion of the housing, for burning the gas generating agent;
a partition member axially dividing a space in the housing so as to form the combustion chamber at a position on a side of the one end portion of the housing and to form the filter chamber at a position on a side of the other end portion of the housing; and
a sealed container accommodating the gas generating agent in a hermetically sealed state,
wherein
the housing having in a portion defining the filter chamber, a gas discharge opening for discharging, a gas to outside,
the filter having a hollow portion extending along the axial direction of the housing and reaching an axial end surface located on a side of the combustion chamber,
the sealed container being made of a member composed of a material lower in mechanical strength than the partition member such that at least a part of a portion of the sealed container opposed to the hollow portion of the filter bursts or melts with increase in pressure or temperature of the combustion chamber as a result of the burning of the gas generating agent,
the partition member being made of a member composed of a material higher in mechanical strength than the sealed container such that at least a part of a portion of the partition member opposed to the hollow portion of the filter bursts with increase in pressure in the combustion chamber as a result of the burning of the gas generating agent to provide a communication hole which allows communication between the combustion chamber and the filter chamber,
the sealed container is arranged such that an axial end portion located on a side of the filter chamber abuts on the axial end surface of the filter located on the side of the combustion chamber, and
the partition member is arranged in the sealed container to abut on the axial end portion of the sealed container located on the side of the filter chamber.

9. The gas generator according to claim 8, wherein
the partition member is in a shape of a flat plate.

10. The gas generator according to claim 8, wherein
the axial end portion of the sealed container located on the side of the filter chamber includes a small-thickness portion relatively smaller in thickness and a large-thickness portion relatively greater in thickness,
the small-thickness portion is located at least in a portion opposed to the hollow portion of the filter, and
the large-thickness portion is located at least in a portion opposed to an outer edge portion of the axial end surface of the filter located on the side of the combustion chamber.

11. The gas generator according to claim 8, wherein
the partition member is in a shape of a cup including a top plate portion in a form of a flat plate and a side plate portion in a form of a cylindrical wall,
the top plate portion abuts on the axial end portion of the sealed container located on the side of the filter chamber, and
the side plate portion abuts on a sidewall portion of the sealed container.

12. The gas generator according to claim 8, wherein
the partition member has a score in a portion opposed to the hollow portion of the filter.

13. The gas generator according to claim 8, wherein
the partition member is provided with a through hole in a portion opposed to the hollow portion of the filter.

* * * * *